United States Patent [19]
Tokunaga et al.

[11] Patent Number: 5,945,606
[45] Date of Patent: Aug. 31, 1999

[54] ELASTIC MEMBER, AND METHOD AND STRUCTURE FOR ATTACHING SENSOR TO SENSOR ATTACHMENT MEMBER USING THE SAME

[75] Inventors: Masatoshi Tokunaga, Chiryu; Hiroshi Nomura, Nagoya; Yukihiro Kato, Kariya, all of Japan

[73] Assignee: Desno Corporation, Kariya, Japan

[21] Appl. No.: 08/919,814

[22] Filed: Aug. 29, 1997

[30] Foreign Application Priority Data

Aug. 30, 1996 [JP] Japan ................................. 8-231132
Apr. 7, 1997 [JP] Japan ................................. 9-088422

[51] Int. Cl.⁶ .............................. G01L 7/00; F16B 13/06
[52] U.S. Cl. .............................................. 73/756; 411/45
[58] Field of Search ................................ 73/756; 174/142, 174/152 R; 277/305, 422, 315, 318, 558, 630, 634, 637, 925, 944; 411/44, 45, 46, 49, 50, 60, 27, 70, 72

[56] References Cited

U.S. PATENT DOCUMENTS

| | | | |
|---|---|---|---|
| 2,706,124 | 4/1955 | Koch | 277/925 |
| 3,272,542 | 9/1966 | Haulik et al. | 411/45 |
| 3,351,974 | 11/1967 | Wilhelmi | 411/45 |
| 4,050,120 | 9/1977 | Yamaguchi | 411/45 |
| 4,274,324 | 6/1981 | Giannuzzi | 411/49 |
| 4,757,664 | 7/1988 | Freissle | 411/63 |
| 4,986,129 | 1/1991 | Ruckenbauer et al. | |
| 5,085,545 | 2/1992 | Takahashi | 411/49 |
| 5,201,623 | 4/1993 | Benedetti et al. | 411/48 |
| 5,211,519 | 5/1993 | Saito | 411/45 |
| 5,317,924 | 6/1994 | Maack | |
| 5,641,255 | 6/1997 | Tanaka | 411/48 |
| 5,667,184 | 9/1997 | Nawa et al. | 411/45 |

FOREIGN PATENT DOCUMENTS

| | | |
|---|---|---|
| 2-012637 | 1/1990 | Japan. |
| 5-264381 | 10/1993 | Japan. |
| 5-264382 | 10/1993 | Japan. |
| 8-062079 | 3/1996 | Japan. |

*Primary Examiner*—Harshad Patel
*Assistant Examiner*—Robin Clark
*Attorney, Agent, or Firm*—Pillsbury Madison & Sutro LLP

[57] ABSTRACT

In an elastic member for attaching a sensor having a protruding portion to a sensor attachment member, the elastic member has a body member having a hollow shape, a first end protrusion formed on an inner surface of the body member close to a first end thereof, and a second end flange protruding outwardly from an outer surface of the body member close to a second end thereof. The sensor protruding portion is inserted into the elastic member from the second end of the elastic member to be a provisionally fixed state, and is inserted into the through hole of the sensor attachment member while keeping the provisionally fixed state. Thereafter, only the sensor protruding portion is additionally inserted into the through hole of the sensor attachment member. These processes can be easily performed by using the above-mentioned elastic member and the thus obtained sensor assembled body has high airtightness and high stability.

56 Claims, 12 Drawing Sheets

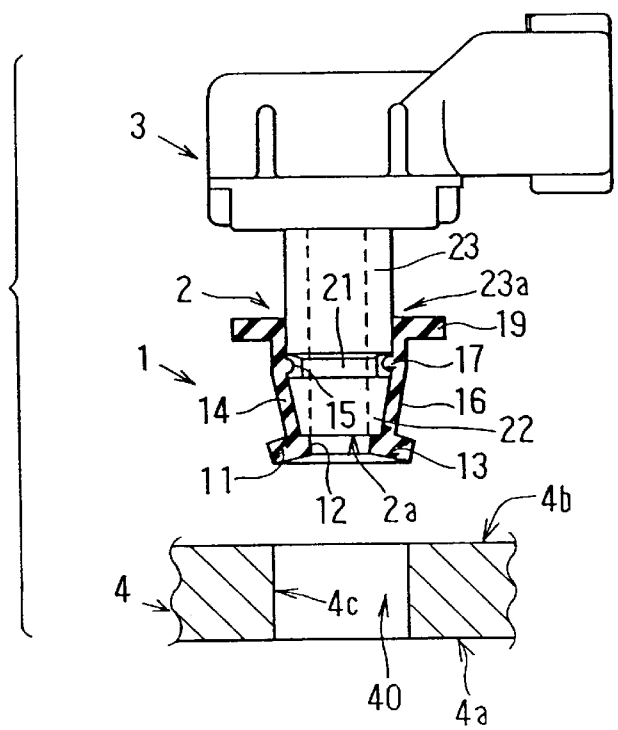
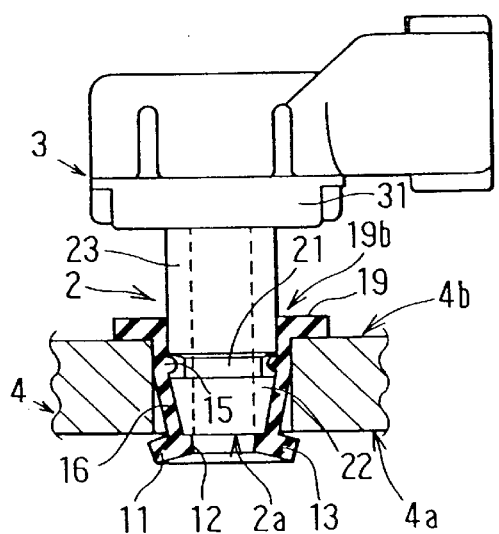
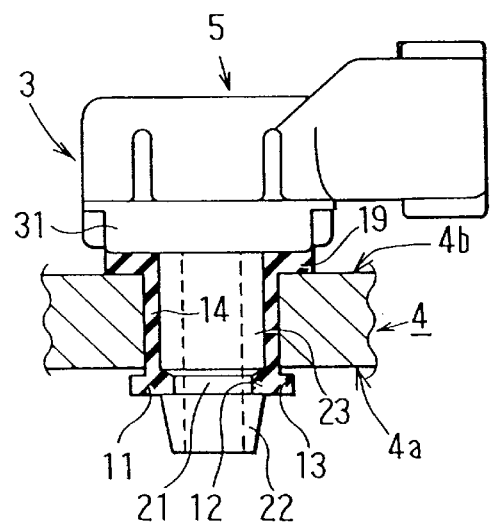

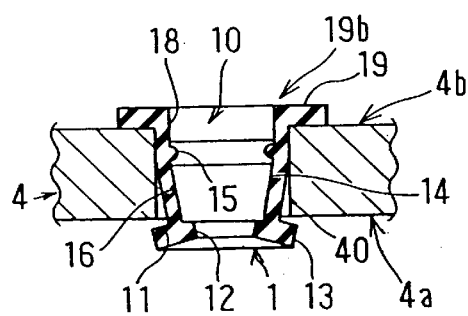
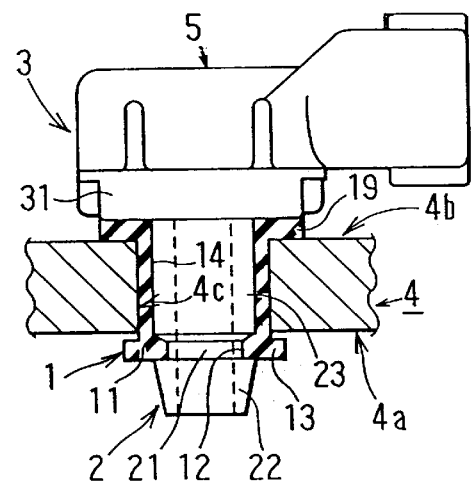
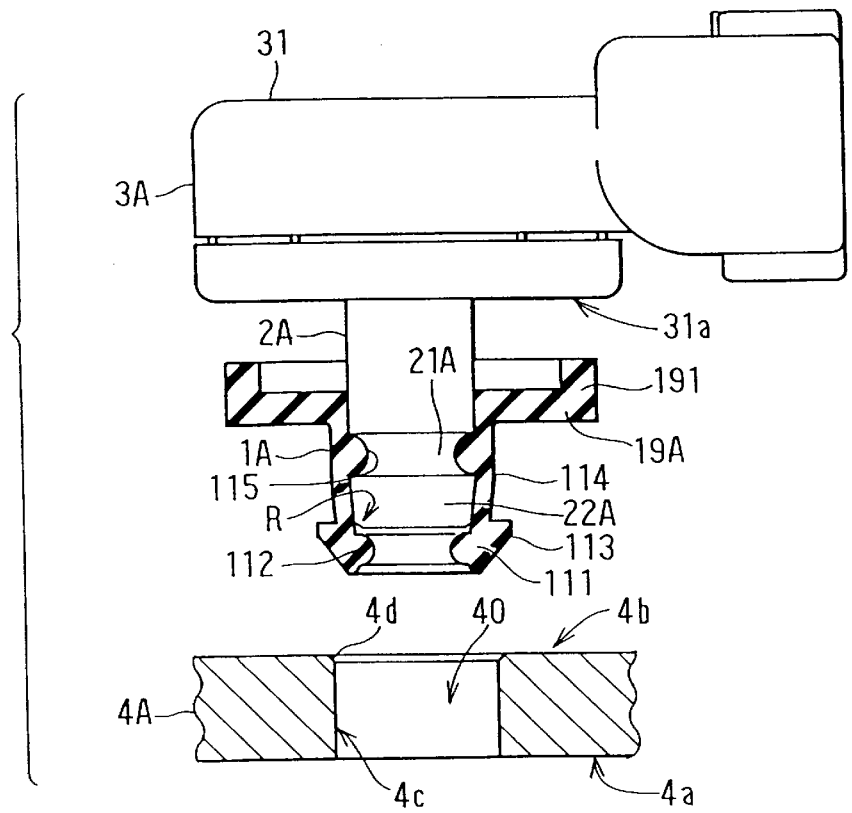

ELASTIC MEMBER, AND METHOD AND STRUCTURE FOR ATTACHING SENSOR TO SENSOR ATTACHMENT MEMBER USING THE SAME

CROSS REFERENCE TO RELATED APPLICATIONS

This application is based upon and claims the benefit of priority of the prior Japanese Patent Applications No. 8-231132 filed on Aug. 30, 1996, and No. 9-88422 filed on Apr. 7, 1997, the contents of which are incorporated herein by reference.

BACKGROUND OF THE INVENTION

1. Field of the Invention

The present invention is related to an elastic member, and a method and a structure for attaching a sensor to a sensor attachment member by inserting a protruding portion of the sensor into a through hole of the sensor attachment member via the elastic member.

2. Related Arts

JP-A-6-160225 discloses a structure for attaching a sensor to a sensor attachment member. In the structure, a sensor housing of the sensor has a protrusion having a flange at a front end thereof. The protrusion of the sensor housing is fitted into a through hole of a boot, and is inserted into a through hole of the sensor attachment member along with the boot. Specifically, the external diameter of the boot at the front end thereof is larger than the internal diameter of the through hole of the sensor attachment member, so that the boot is forcibly inserted into the through hole of the sensor attachment member.

In this case, however, when the protrusion of the sensor housing is inserted into the through hole of the boot, it is necessary that the flange formed at the front end of the protrusion passes through the through hole of the boot forcibly expanding the through hole of the boot with a force having a relatively large intensity, thereby resulting in elastic deformation of the boot. In addition, when the thus inserted protrusion of the sensor housing and the boot are inserted into the through hole of the sensor attachment member, as mentioned above, because the external diameter of the boot at the front end thereof is larger than the internal diameter of the through hole of the sensor attachment member, the boot is elastically deformed so that the outer diameter thereof is reduced by a thrusting force to be substantially equal to the internal diameter of the thorugh hole of the sensor attachment member.

Accordingly, in the process of attaching the sensor to the sensor attachment member, the boot needs to be deformed twice by a force having a large intensity, thereby resulting in excess labor of a worker and an additional jig for for the attachment the sensor. Further, if the amount of deformation of the boot is considerably large, the bush may be damaged.

SUMMARY OF THE INVENTION

The present invention has been made in view of the above-mentioned problems and an object of the present invention is to provide an elastic member for fixing a sensor to a sensor attachment member. The other object of the present invention is to provide a method and a structure for easily attaching a sensor to a sensor attachment member by just pushing, and more specifically, to provide a method and a structure for easily and reliably attaching a sensor to a sensor attachment member by using an elastic member.

According to the present invention, in an elastic member for attaching a sensor having a protruding portion to a sensor attachment member, the elastic member has a body member having a hollow shape with first and second ends thereof for receiving the sensor protruding portion therein, a first end protrusion (which is referred to as a second protrusion in claim 8) protruding from an inner surface of the body member close to the first end, and a second end flange protruding outwardly from an outer surface of the body member close to the second end. The sensor protruding portion is inserted into the elastic member from the second end of the elastic member and is inserted into a through hole of the sensor attachment member via the elastic member, thereby being fixed to the sensor attachment member.

By using the elastic member according to the present invention, the sensor protruding portion can be inserted into the elastic member from the second end of the elastic member until the fore end portion thereof abuts the first end protrusion of the elastic member, thereby forming a provisionally fixed state with the elastic member. At the same time, the sensor protruding portion is covered with the body member of the elastic member to cause a frictional force therebetween, so that the provisionally fixed state can be kept.

Next, the elastic member and the sensor protruding portion can be inserted into the through hole of the sensor attachment member until the second end flange abuts a surface of the sensor attachment member, while keeping the provisionally fixed state thereof. This position of the elastic member with respect to the sensor attachment member is a set position. Because of the second end flange, the elastic member is prevented from being inserted into the through hole of the sensor attachment member too deeply to pass through the through hole. In addition, because the fore end portion of the sensor protruding portion abuts the first end protrusion of the elastic member to push the elastic member, the elastic member can be easily inserted into the through hole of the sensor attachment member.

Thereafter, the sensor protruding portion is additionally inserted into the elastic member as well as into the through hole of the sensor attachment member, which the elastic member is kept to be held at the set position in the through hole of the sensor attachment member.

Preferably, the elastic member has a tapered portion on a first end side thereof, an outer diameter of which gradually decreases to the first end thereof. More preferably, the elastic member has a first end flange protruding from the outer surface of the body member at the position close to the first end of the elastic member. Accordingly, when the sensor protruding portion is more deeply inserted into the elastic member as well as into the through hole of the sensor attachment member, the sensor protruding portion expands the tapered portion of the elastic member so that a fore end portion thereof protrudes from the elastic member, so that the first end flange abuts the other surface of the sensor attachment member. As a result, the elastic member can be prevented from disconnecting from the through hole of the sensor attachment member. Simultaneously, the sensor protruding portion is also prevented from disconnecting from the elastic member.

In this case, the first end protrusion also serves to fix the sensor protruding portion in the elastic member. The sensor protruding portion can have a groove on an outer surface thereof to receive the first end protrusion of the elastic member in the state where the sensor protruding portion is completely inserted into the through hole of the sensor attachment member. Accordingly, the first end protrusion of the elastic member can more efficiently fix the sensor protruding portion with respect to the elastic member. Further, the positioning of the sensor protruding portion with respect to the elastic member in the axial direction of the sensor protruding portion becomes easy. In addition, when the sensor protruding portion has a tapered fore end portion, the insertion of the sensor protruding portion into the elastic member becomes easy.

The elastic member can have an intermediate protrusion (which is referred to as a first protrusion in claim 8) provided on the inner surface of the body member between the first and second ends thereof. The intermediate protrusion can serve to seal between the sensor protruding portion and the through hole of the sensor attachment member as an O-ring. Accordingly, after the attachment of the sensor is completed, the air tightness is improved. In addition, if simultaneously the sensor protruding portion has the above-mentioned groove, the intermediate protrusion can be fitted into the groove in the provisionally fixed state to provisionally fix the sensor protruding portion in the elastic member, so that the handling of the sensor protruding portion and the elastic member becomes easy.

Preferably, the elastic member has a rotationally symmetrical shape, resulting in low manufacturing cost. Further, because the rotationally symmetrical shape does not have corners which are liable to be damaged, the strength of the elastic member becomes large. Because of this, it is preferable that the elastic member according to the present invention is applied to a sensor protruding portion having a cross-sectional shape of a generally cylindrical shape, a generally pole-like shape, or the like, which is to be inserted into a through hole having a cross-sectional shape of a generally circular shape. However, the elastic member is applicable to a sensor protruding portion having a cross-sectional shape of an ellipse, an octagon, or the like.

The elastic member can have only the first end protrusion (second protrusion) and the intermediate protrusion (first protrusion).

The elastic member can additionally have sensor rotation preventive means. Accordingly, the sensor is more securely prevented from rotating with respect to the elastic member and the sensor attachment member, so that the variations of the attachment of the sensor is reduced, thereby resulting in high sensitivity of the sensor. Further, a lead wire connected to the sensor is not liable to be broken, thereby resulting in high reliability of the sensor. Furthermore, because the sensor protruding portion does not rotate with respect to the elastic member, the elastic member is not worn, so that the sensor can maintain high airtightness and sufficient characteristics.

The present invention provides a sensor assembled body including a sensor attached to a sensor attachment member by using the above-mentioned elastic member. The present invention further provides a method for attaching a sensor to a sensor attachment member by using the above-mentioned elastic member. Accordingly, as mentioned above, the sensor is attached to the sensor attachment member via the elastic member just by pushing the sensor, so that the assembled body in which the sensor is securely fixed to the sensor attachment member via the elastic member with high airtightness is easily and reliably obtained. Incidentally, the present invention is applied not only to sensors such as a pressure sensor, a temperature sensor, an oxygen content sensor, and the like, but also to the other components having protruding portions to be attached to an attachment member having a through hole.

BRIEF DESCRIPTION OF THE DRAWINGS

Other objects and features of the present invention will become more readily apparent from a better understanding of the preferred embodiments described below with reference to the following drawings.

FIG. 6A is a partial cross-sectional view showing a state after the provisional assembling step in the first embodiment;

FIG. 6B is a partial cross-sectional view showing a state after an intermediate inserting step in the first embodiment;

FIG. 6C is a partial cross-sectional view showing a state after a final inserting step in the first embodiment;

FIG. 9A is a partial cross sectional veiw showing an elastic member inserting step in a second modified embodiment of the first embodiment;

FIG. 9B is a partial cross-sectional view showing a sensor protruding portion inserting step in the second modified embodiment of the first embodiment;

FIG. 10 is a partial cross-sectional view showing an elastic member, a sensor, and a sensor attachment member in a second preferred embodiment according to the present invention;

DETAILED DESCRIPTION OF THE PREFERRED EMBODIMENTS

Embodiments according to the present invention will be described hereinunder with reference to the drawings.

(First Embodiment)

Figure 1:
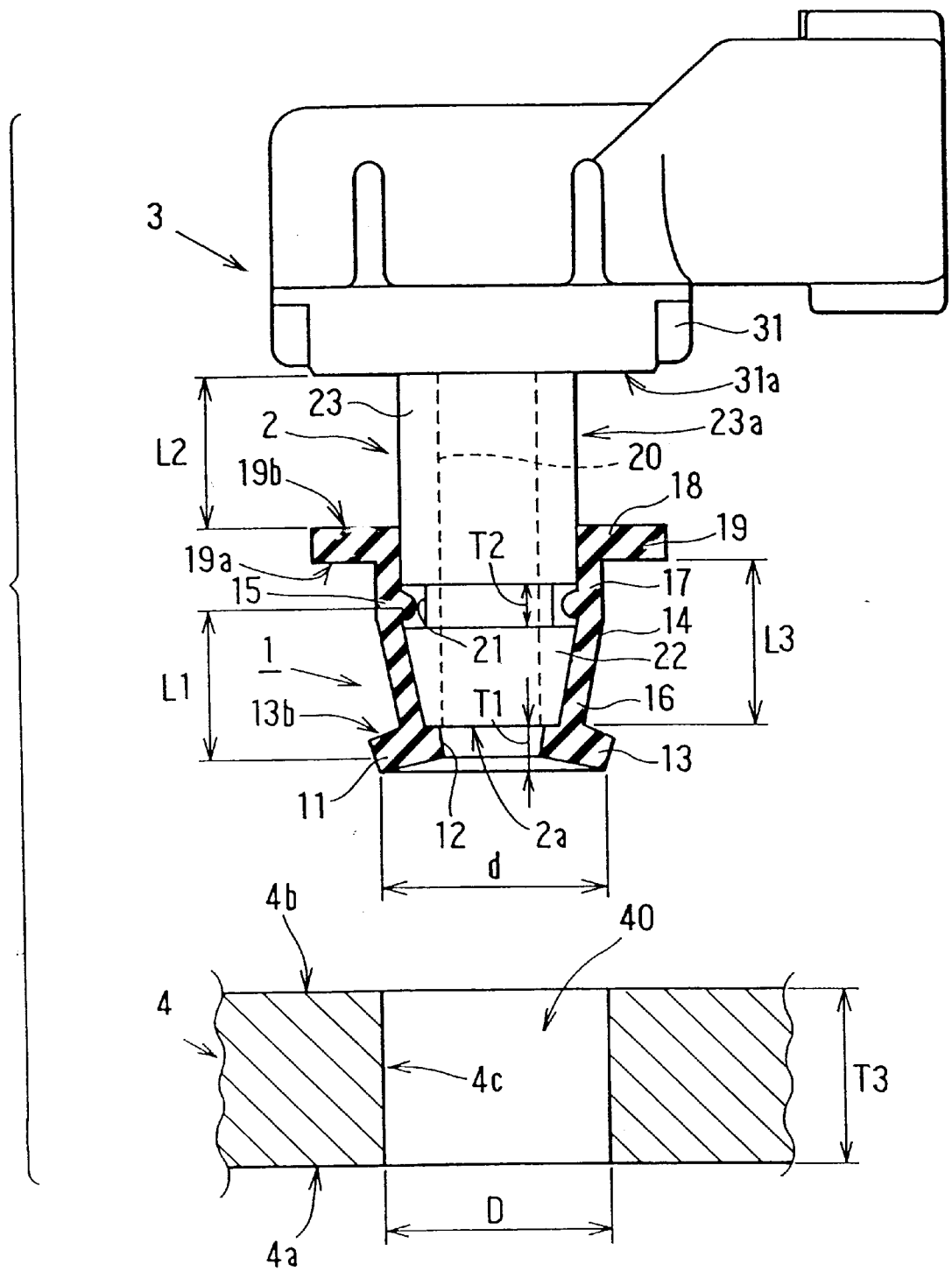
FIG. 1 is a partial cross-sectional view showing a previsionally fixed state of a sensor, an elastic member and a sensor attachment member in a first preferred embodiment according to the present invention.

In a first preferred embodiment of the present invention, as shown in FIG. 1, an elastic member 1 for attaching a sensor 3 to a sensor attachment member 4 is provisionally attached on a sensor protruding portion 2 of the sensor 3 (i.e., in a provisionally fixed state), and is inserted into a through hole 40 (which is referred to as an insertion hole in the present invention) formed in the sensor attachment member 4. On completion of the inserting operation (i. e., on completion of a sensor attaching operation), the sensor 3 can be fixed to the through hole 40 via the elastic member 1.

Figure 2:
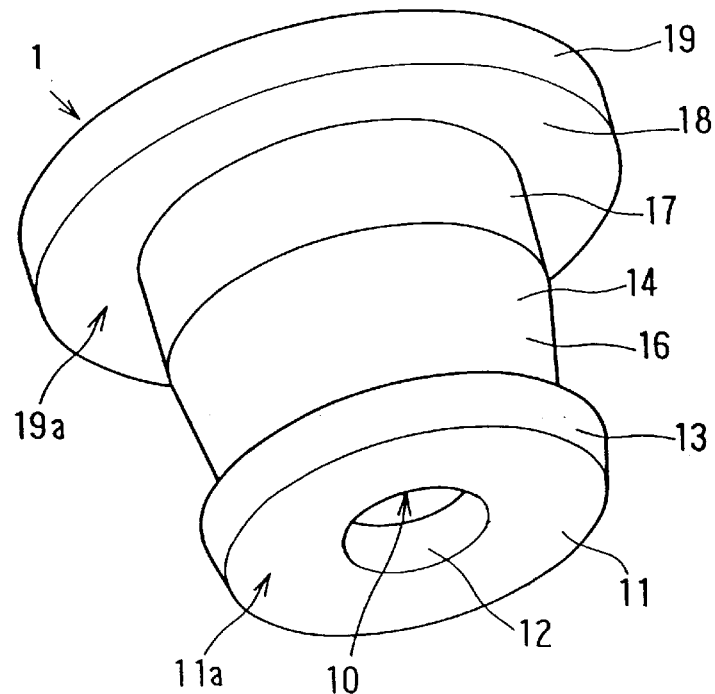
FIG. 2 is a perspective view showing the elastic member for attaching the sensor to the sensor attachment member in the first embodiment.
Figure 3:
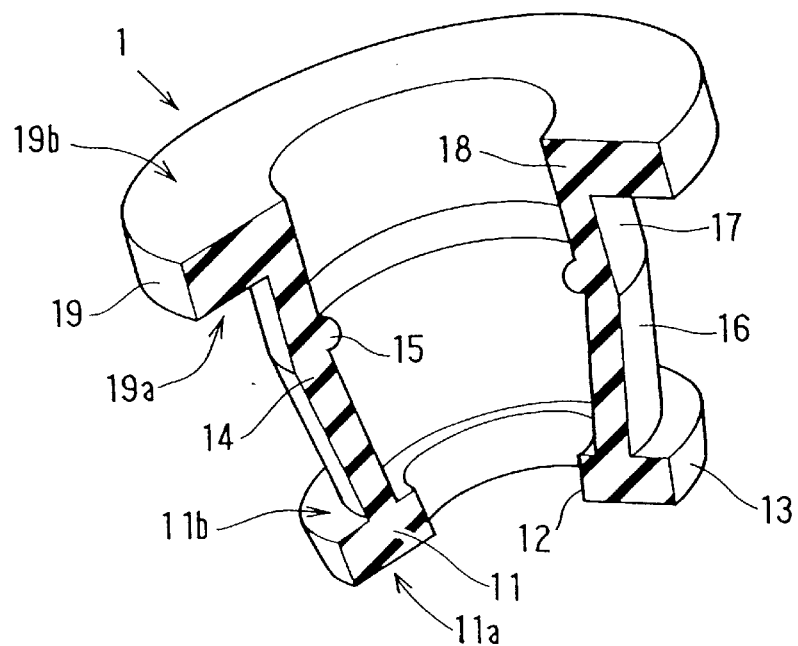
FIG. 3 is a partial cross-sectional view showing the elastic member in the first embodiment.

The elastic member 1 shown in FIGS. 2 and 3 has a substantially symmetrical hollow member composed of a fore end portion 11, an intermediate portion 14 and a rear end portion 18 which are integrally formed from elastic material of silicone rubber. The elastic member 1 further includes a fore end protrusion 12 (which is referred to as a second protrusion) encircling the inner surface of the fore end portion 11 and protruding from the inner surface of the fore end portion 11 to encircle the inner surface, and a fore end flange 13 (which is also referred to as a second protrusion) protruding from the outer surface of the fore end portion 11.

The intermediate portion 14 of the elastic member 1 covers a fore end portion 22 of the sensor protruding portion 2 and part of an intermediate portion 23 thereof, and has a fore half portion 16 having inner and outer circumferential surfaces tapered with respect to the axial direction thereof, and a rear half portion 17 having inner and outer circumferential surfaces parallel to the axial direction thereof. Incidentally, the outer circumferential surface of the fore half portion 16 should not always be limited to the tapered contour, and alternatively, it may have a cylindrical surface. If the fore half portion 16 has the cylindrical shape, the airtightness between the sensor protruding portion 2 and the sensor attachment member 4 can be improved when the sensor 3 is attached to the sensor attachment member 4, and moreover, an intensity of a frictional force therebetween can be elevated to prevent rotation and slippage of the sensor 3.

The intermediate portion 14 of the elastic member 1 further has an intermediate protrusion 15 (a first protrusion) continuously formed on the inner circumferential surface thereof to be fitted into a groove 21 (an engagement portion) formed on the outer circumferential surface 23a at the front end of the intermediate portion 23 of the sensor protruding portion 2. The elastic member 1 further includes a rear end flange 19 protruding from the outer circumferential surface of the rear end portion 18 and integrally formed with the other portions.

Here, in the provisionally fixed state, a distance L1 between the fore end protrusion 12 and the intermediate protrusion 15 of the elastic member 1 is substantially equal to a distance L2 between the rear end flange 19 of the elastic member 1 and a sensor main body 31. A width T1 of the fore end protrusion 12 of the elastic member 1 is substantially equal to a width T2 of the groove 21 of the sensor protruding portion 2. A distance L3 between the fore end flange 13 and the rear end flange 19 of the elastic member 1 is substantially equal to a plate thickness T3 of the sensor attachment member 4. Additionally, the outer diameter d of the fore end flange 13 of the elastic member 1 at the foremost end thereof is equal to or appreciably smaller than the inner diameter D of a through hole 40 formed in the sensor attachment member 4. Therefore, the fore end flange 13 of the elastic member 1 is easily inserted into the through hole 40 of the sensor attachment member 4. Further, the diameter of the outer circumferential surface of the rear half portion 17 of the intermediate portion 14 of the elastic member 1 is substantially equal to the inner diameter D of the through hole 40 of the sensor attachment member 4.

A function and advantageous effects of the elastic member 1 for attaching the sensor 3 to the attachment member 4, constructed in the above-described manner will be described in more detail later.

Figure 4:
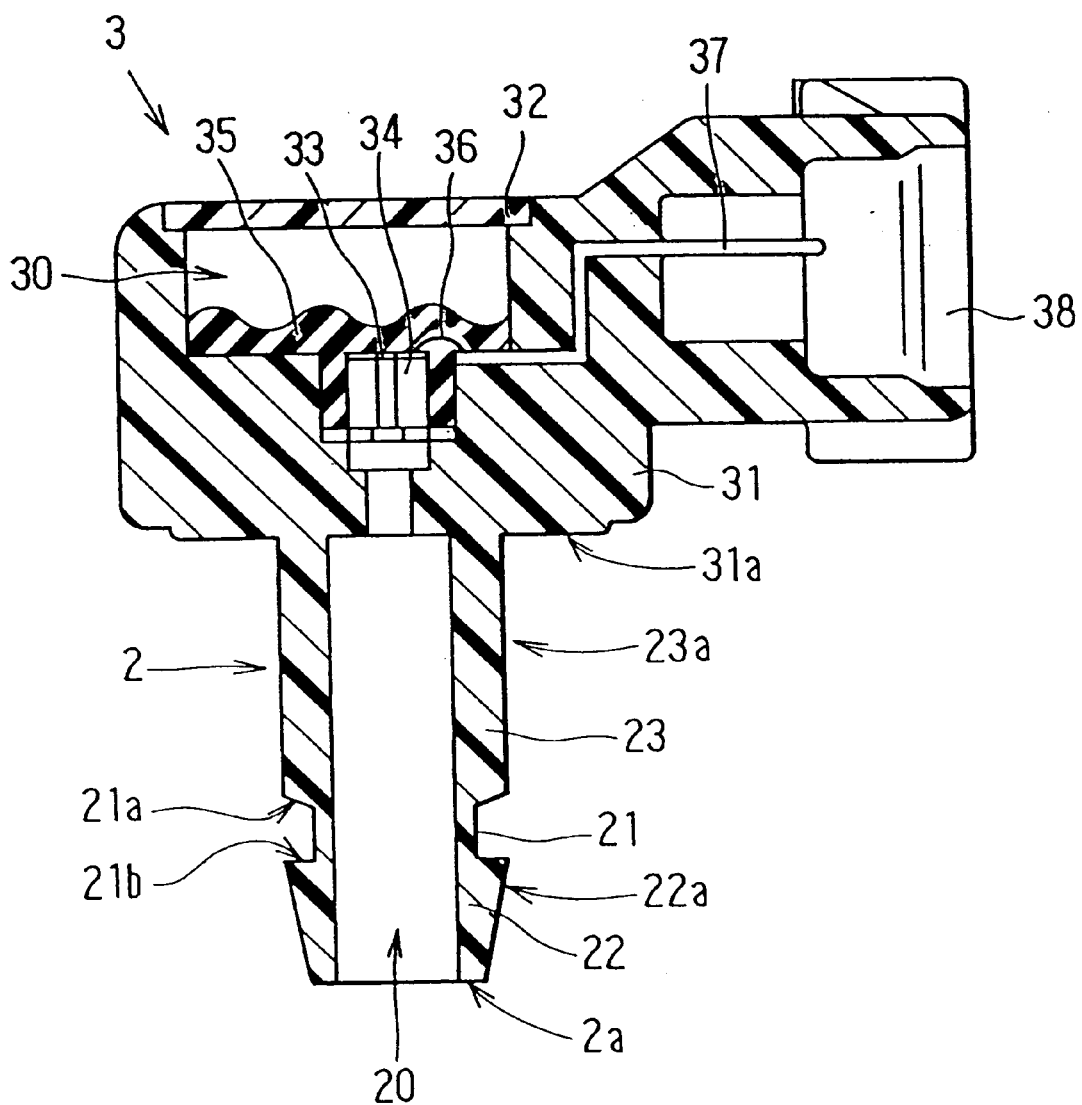
FIG. 4 is a side cross-sectional view showing a sensor employed as the sensor in the first embodiment.

The sensor 3 employed in this embodiment of the present invention is a pressure sensor shown in FIG. 4, composed of the sensor protruding portion 2 and the sensor main body 31 (sensor housing), the outer diameter of which is larger than that of the sensor protruding portion 2. The sensor protruding portion 2 and the sensor main body 31 are integrally molded from resin having heat resistance.

The sensor protruding portion 2 has a substantially cylindrical shape having a pressure conduction hole 20 formed through the central part thereof, and composed of the fore end portion 22, outer circumferential surface 22a of which is tapered off toward the front end thereof, and the cylindrical hollow intermediate portion 23. The above-described groove 21 having a constant width and a constant depth is formed at the fore end part of the outer circumferential surface 23a of the intermediate portion 23 to encircle the outer circumferential surface 23a thereof. A rear wall 21a of the groove 21 is formed with a side face of a truncated cone having a half apex angle ranging from approximately 70 degrees to 80 degrees. A fore wall 21b of the groove 21 is substantially perpendicular to the axial direction of the sensor protruding portion 2.

The sensor main body 31 has an inner space 30 in the interior thereof, and a sensor tip 33 made of semiconductor and including a pressure sensing portion is airtightly fixed to the sensor main body 31 via a base 34 made of glass in the inner space 30. A communication hole is formed in the central part of the base 34 to allow the pressure conduction hole 20 to communicate with the sensor tip 33, whereby a pressure is conducted to the sensor tip 33 through the pressure conduction hole 20 and the communication hole of the base 34. A signal issued from the sensor tip 33 is transmitted through a bonding wire 36 and a lead wire 37 to a connector 38 disposed on the side end part of the sensor main body 31. The sensor tip 33, the base 34 and the bonding wire 36 are immersed in a protective agent 35, and the inner space 30 is sealed with a cover member 32. Incidentally, the sensor main body 31 has a plane end surface 31a on the side of the sensor protrusion portion 2.

Next, a process for attaching the sensor 3 to the sensor attachment member 4 in this embodiment will be explained in more detail. The process includes three steps, i.e., a provisional assembling step (which is referred to as a first step), an intermediate inserting step (which is referred to as a second step), and a final inserting step (which is referred to as a third step).

Figure 5:
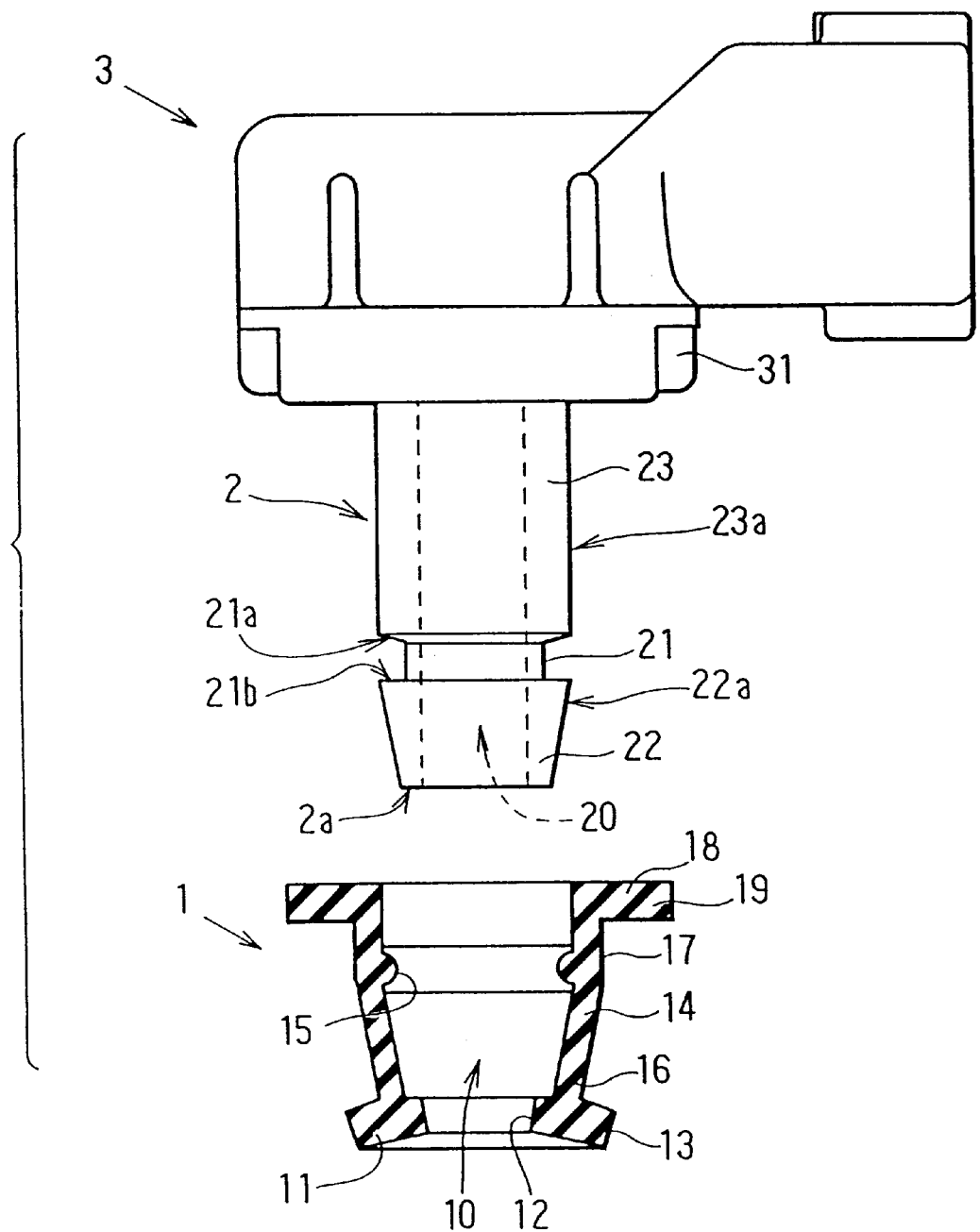
FIG. 5 is a parial cross-sectional view showing the sensor and the elastic member just before a provisional assembling step in the first embodiment.
Figure 7:
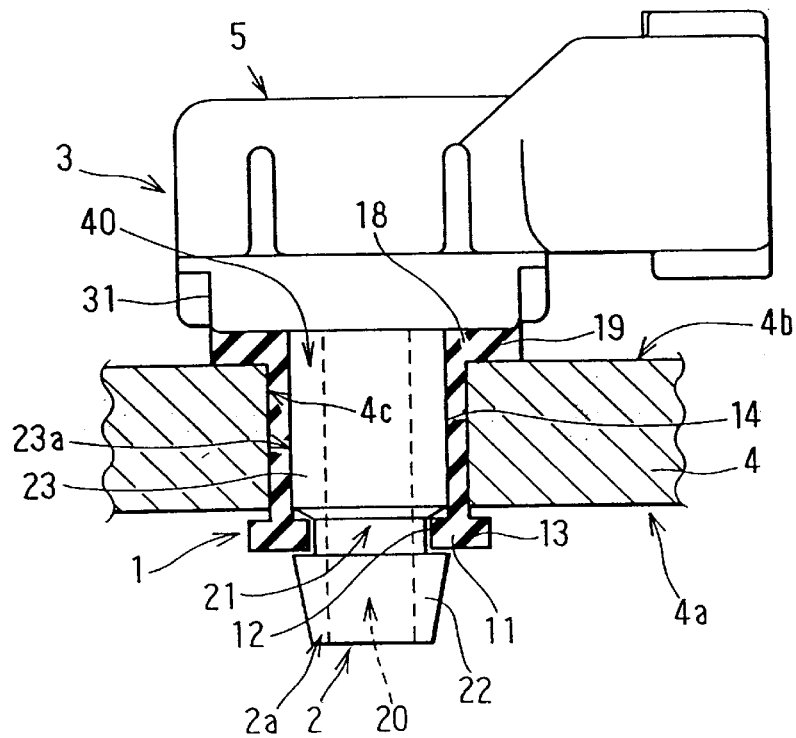
FIG. 7 is a partial cross-sectional view showing a sensor assembled body in the first embodiment.

In the provisional assembling step, the elastic member 1 having a hollow inner space 10 therein shown in FIG. 5 is attached to the sensor protruding portion 2 to be in the provisionally fixed state as shown in FIG. 6A. In the provisionally fixed state, the intermediate protrusion 15 of the intermediate portion 14 of the elastic member 1 is fitted into the groove 21 of the sensor protruding portion 2 to prevent the elastic member 1 from disconnecting from the sensor protruding portion 2.

In the intermediate inserting step, while the above-mentioned provisionally fixed state is maintained, the sensor protruding portion 2 and the elastic member 1 are inserted into the through hole 40 formed in the sensor attachment member 4 to the position where the elastic member 1 is to be set in the through hole 40 as shown in FIG. 6B. In this intermediate inserting step, the fore end surface 2a of the sensor protruding portion 2 abuts the fore end protrusion 12 protruding from the inner circumferential surface of the elastic member 1 to insert the elastic member 1 into the through hole 40 of the sensor attachment member 4. The elastic member 1 is inserted into the through hole 40 by a thrusting force having a predetermined intensity until the rear end flange 19 of the elastic member 1 abuts the outside wall surface 4b of the sensor attachment member 4 along with the sensor protruding portion 2 as shown in FIG. 6B. When the rear end flange 19 of the elastic member 1 abuts the wall surface 4b of the sensor attachment member 4, the inserting operation of the elastic member 1 in the intermediate inserting step is completed. Here, the position where the elastic member 1 is attached to the sensor attachment member 4 is referred as a set position in the present invention.

The final inserting step is a step which is performed such that the sensor 3 is fixed to the sensor attachment member 4 via the elastic member 1 in a state shown in FIG. 6C by deeply thrusting the sensor protruding portion 2 into the through hole 40 of the sensor attachment member 4 as well as into the through hole of the elastic member, while elastic member 1 maintains its set position. In this final inserting step, the intermediate protrusion 15 of the elastic member 1 climbs the rear wall 21a of the groove 21 (see FIG. 5), and is clamped between the inner circumferential surface 4c of the through hole 40 and the outer circumferential surface 23a of the sensor protruding portion 2, thereby resulting in airtightness therebetween. As the sensor protruding portion 2 is additionally pushed into the through hole 40, the fore end portion 22 thereof protrudes from the through hole 40. Consequently, the fore end protrusion 12 of the elastic member 1 falls in the groove 21 of the sensor protruding portion 2 to be recieved in the groove 21 of the sensor protruding portion 2. As a result, the sensor protruding portion 2 is fixed in the through hole 40 of the sensor attachment member 4 via the elastic member 1 in the axial direction thereof, thereby forming a sensor assembled body 5 shown in FIG. 6C. In addition, in the final inserting step, the tapered fore end portion 21 of the sensor protruding portion 2 forcibly expands the fore end portion 11 of the elastic member 1 from the inside of the fore end portion 11 so that the fore end flange 13 of the elastic member 1 expands to have an outer diameter larger than the inner diameter of the through hole 40 of the sensor attachment member 4. As a result, the elastic member 1 is prevented from disconnecting from the through hole 40.

In the above-mentioned assembling process, in the case where liquid or paste-like lubricant is applied to the outer circumferential surface of the sensor protruding portion 2, the outer and inner circumferential surfaces of the elastic member 1, the inner circumferential surface of the through hole 40 and the like, the intensity of the frictional force between the elastic member 1 and the sensor protruding portion 2 as well as between the elastic member 1 and the inner circumferential surface 4c of the through hole 40 can be reduced. This leads to a result that the above-mentioned assembling process can easily be performed. With respect to the lubricant, it is desirable that a kind of lubricant is chosen not to deteriorate any one of the elastic member 1, the sensor protruding portion 2 and the sensor attachment member 4. If the sensor protruding portion 2 needs not to be disconnected from the through hole 40 of the sensor attachment member 4 and is permanently and tightly fixed in the through hole 40, an adhesive may be used in place of the lubricant.

For example, in the case where water is used as lubricant, water does not have toxicity and the cost is very low. Moreover, water gradually disappears as it is increasingly vaporized after the sensor 3 is attached to the sensor attachment member 4. For these reasons, the usage of water is conveniently acceptable. In more detail, when water disappears after the sensor 3 is attached, the intensity of the frictional force between the elastic member 1 and the sensor protruding portion 2 as well as between the elastic member 1 and the through hole 40 is increased. As a result, the sensor protruding portion 2 is hardly disconnected from the through hole 40, whereby the sensor 3 can be more reliably held on the sensor attachment member 4.

Next, the advantageous effects of the foregoing method for attaching the sensor 3 to the sensor attachment member 4 in the first embodiment will be explained. First, when the provisional assembling step is performed, the elastic member 1 is attached to the sensor protruding portion 2 to be in the provisionally fixed state. In this state, the intermediate protrusion 15 of the elastic member 1 is fitted into the groove 21 of the sensor protruding portion 2 to prevent the elastic member 1 from unexpectedly disconnecting from the sensor protruding portion 2. Therefore, it is difficult for the elastic member 1 to be disconnected from the sensor protruding portion 2, so that the elastic member 1 can easily be handled.

In addition, since both the elastic member 1 and the sensor protruding portion 2 can be handled with operator's one hand, it is possible that the operator searches the through hole 40 of the sensor attachment member 4 with his the other hand to prepare for the next intermediate inserting step while performing the provisional assembling step.

Next, in the intermediate inserting step, the elastic member 1 and the sensor protruding portion 2 are inserted into the through hole 40 while maintaining the provisionally fixed state until the elastic member 1 is inserted to the predetermined set position thereof. In the set position, as mentioned above, the rear end flange 19 of the elastic member 1 abuts the outside wall surface 4b of the sensor attachment member 4 to prevent the elastic member 1 from additionally being inserted into the through hole 40. In other words, the rear end flange 19 of the elastic member 1 abuts the outside wall surface 4b of the sensor attachment member 4, whereby the set position of the elastic member 1 relative to the thorugh hole 40 can easily and exactly be determined.

Here, in the following final insertion step, the outer diameter of the fore half portion 16 of the elastic member 1 is dimensionally enlarged to be reliably fixed in the through hole 40. Therefore, in the intermediate inserting step, it is not necessary that the diameter of the elastic member 1 is larger than the inner diameter D of the through hole 40. In this embodiment, the outer diameter of the elastic member 1 is substantially equal to the inner diameter D of the through hole 40. Consequently, the elastic member 1 is smoothly inserted into the through hole 40 with a small frictional resistance generated between the elastic member 1 and the through hole 40.

In addition, when inserting the elastic member 1 and the sensor protruding portion 2 into the through hole 40, because the intermediate protrusion 15 of the elastic member 1 is fitted into the groove 21 of the sensor protruding portion 2, the wall of the groove 21 pushes the intermediate protrusion 15 in the insertion direction. Therefore, even if the friction force between the elastic member 1 and the through hole 40 is not so small, the elastic member 1 holding the sensor protruding portion 2 therein can be inserted into the through hole 40 while maintaining the provisionally fixed state. Therefore, the outer diameter of the elastic member 1 may be somewhat larger than the inner diameter D of the through hole 40. In this case, the airtightness between the elastic member 1 and the through hole 40 can be easily realized.

In the final inserting step, only the sensor protruding portion 2 is more deeply inserted into the through hole 40 as well as into the elastic member 1, while the elastic member 1 is held at the set position in the through hole 40 by the effect of the rear end flange 19 thereof. Accordingly, the relative position between the elastic member 1 and the sensor protruding portion 2 changes, so that the intermediate protrusion 15 of the elastic member 1 is out of the groove 21 of the sensor protruding portion 2, and is forcibly pushed in the radial direction thereof by the outside circumferential surface 23a of the intermediate portion 23 of the sensor protruding portion 2. Accordingly, the elastic force of the elastic member is enhanced at the intermediate protrusion 15 thereof to seal up between the intermediate portion 23 of the sensor protruding portion 2 and the through hole 40. In this case, the intermediate protrusion 15 of the elastic member 1 functions as an O-ring, thereby resulting in high airtightness between the sensor protruding portion 2 and the through hole 40.

In this way, the elastic member 1 is firmly fixed not only to the through hole 40 but also to the sensor protruding portion 2. As a result, the sensor assembled body 5 shown in FIG. 6C having high airtightness can be built up. The elastic member 1 is hardly released from the given position unless an exterior force having an unexpected high intensity is applied to the elastic member 1. Simultaneously, the sensor protruding portion 2 is firmly fixed in the through hole 40 via the elastic member 1. That is, the sensor 3 is firmly fixed to the sensor attachment member 4 not to be disconnected from the sensor attachment member 4.

Consequently, according to the above-mentioned method for attaching the sensor 3 to the sensor attachment member 4 in the first embodiment, the sensor 3 is firmly fixed to the sensor attachment member 4 by merely inserting the elastic member 1 and the sensor protruding portion 2 being in the provisional fixed state into the through hole 40 in the intermediate inserting and final inserting steps. As is apparent from the above description, attaching the sensor 3 to the sensor attachment member 4 only requires a force having a relative small intensity, and moreover, can be easily performed only by pushing, thereby forming the sensor assembled body 5 having a large strength and high airtightness.

The thus obtained sensor assembled body 5 has several advantageous effects as mentioned below. Firstly, because the fore end portion 24 of the sensor protruding portion 2 in which the pressure conduction hole 20 is provided is protruded from the through hole 40, the sensor 3 can detect the pressure applied thereto through the pressure conduction hole 20 thereof without being affected by the wall surface 4a of the sensor attachment member or the like, thereby resulting in more precise detection of the sensor 3.

Secondly, the groove 21 formed on the outer circumferential surface 23a of the sensor protruding portion 2 is engaged with the fore end protrusion 12 protruded from the inner circumferential surface of the elastic member 1, so that the sensor protruding portion 2 is securely fixed relative to the sensor attachment member 4 to not move in the axial direction thereof. For this reason, the sensor 3 can more stably be held at the predetermined position.

Thirdly, the rear end flange 19 of the elastic member 1 interposes between the sensor main body 31 and the outside wall surface 4b of the sensor attachment member 4 and the depth of insertion of the sensor protruding portion 2 into the through hole 40 is restricted by bringing the sensor main body 31 to abut the rear end flange 19. Because it is practically impossible that the rear end flange 19 of the elastic member 1 passes through the through hole 40, there does not arise a problem that the elastic member 1 unintentionally passes through the through hole 40. In the case where the pressure on the side of the sensor main body 31 with respect to the through hole 40 is higher than that on the opposite side, the rear end flange 19 of the elastic member 1 is sandwiched between the sensor main body 31 and the sensor attachment member 4 by a thrusting force, thereby resulting in high airtightness therebetween.

Fourthly, the fore end flange 13 of the elastic member 1 abuts the inside wall surface 4a of the sensor attachment member 4 on the opposite side of the outside wall surface 4b, thereby enhancing the effect of preventing the elastic member 1 and the sensor protruding portion 2 from moving in the axial direction thereof. In addition, in the case where the pressure on the fore end side of the sensor protruding portion 2 with respect to the through hole 40 is higher than that on the opposite side, the fore end flange 13 is pushed against the inside wall surface 4a of the sensor attachment member 4, thereby resulting in high airtightness between the fore end flange 13 of the elastic member 1 and the inside wall surface 4a of the sensor attachment member 4. In this case, the groove 21 of the sensor protruding portion 2 and the fore end protrusion 12 of the elastic member are simultaneously brought in close contact with each other, so that high airtightness can be obtained between the outer circumferential surface of the sensor protruding portion 2 and the inner circumferential surface of the elastic member 1. In addition, the elastic member 1 is prevented by the fore end flange 13 from being disconnected from the through hole 40 toward the side of the sensor main body 31.

Fifthly, as described above, because the intermediate protrusion 15 formed on the inner circumferential surface of the elastic member 1 (see FIGS. 4 and 5) is compressed in the radial direction thereof, the intensity of the thrusting force for holding the elastic member 1 between the outer circumferential surface 23a of the sensor protruding portion 2 and the inner circumferential surface 4c of the through hole 40 is increased at the part where the intermediate protrusion 15 of the elastic member 1 is interposed therebetween. Thus, the intermediate protrusion 15 has the same sealing function as that of an O-ring, whereby the airtightness of the sensor assembled body 5 can further be improved.

Accordingly, the sensor assembled body 5 has a simple structure and can be formed just by pushing; nevertheless the sensor assembled body 5 can stably hold the sensor 3 therein with extremely high aritightness. Incidently, because the elastic member 1 can finely elastically deform in the sensor assembled body 5, the sensor 3 can finely move relative to the sensor attachment member 4. As a result, the sensor assembled body 5 can absorb an impact and suppress vibrations therein to some extent.

It should be noted that material employable for the elastic member 1 should not be limited only to silicon rubber. Alternatively, a various kind of rubber, e. g., fluoro rubber, acrylic rubber, fluorosilicon rubber, ethylene propylene rubber (EPDM), acrylonitrile-butadiene rubber (NBR) and acrylonitrile-butadiene rubber containing hydrogen added thereto (H-NBR) may be employed as the material for the elastic member 1. Additionally, the elastic member 1 may be made of the material other than rubber, provided that the material has adequate rubber elasticity.

(First Modified Embodiment of the First Embodiment)

Figure 8:
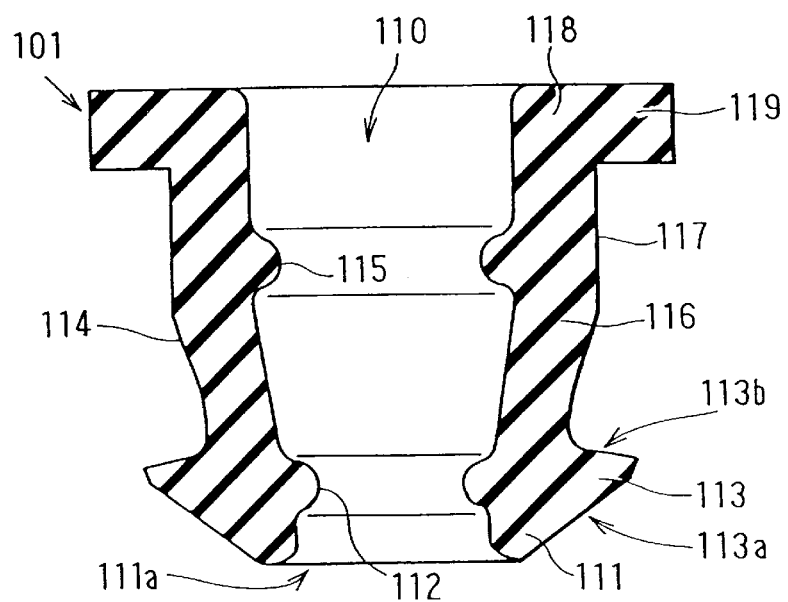
FIG. 8 is a cross-sectional view showing an elastic member in a first modified embodiment of the first embodiment.

In a first embodiment of the first modified embodiment, an elastic member 101 shown in FIG. 8 is employed in place of the elastic member 1 in the first embodiment. In this modified embodiment, a pressure sensor 3 and a sensor attachment member 4 are the same as those in the above-described first embodiment and are shown with the same reference numerals.

In this modified embodiment, the elastic member 101 is integrally formed with a fore end portion 111 having a fore end protrusion 112 and a fore end flange 113, an intermediate portion 114 having a fore half portion 116 and a rear half portion 117 with an intermediate protrusion (first protrusion) 115 protruding from the inner surface thereof, and a rear end portion 118 having a rear end flange 119. The features and effects derived from the elastic member 101 in the first modified embodiment are the same as those in the first embodiment; however, there are two different points between the elastic member 101 in the first modified embodiment and the elastic member 1 in the first embodiment.

A first different point consists in that any angular portion or any angular corner is not recognized on the fore end protrusion 112 and on the intermediate protrusion 115 forming an inner space 110. The fore end protrusion 112 and the intermediate protrusion 115 respectively have gently contours with rounded corners respectively having an adequate curvature. Because of this, when the elastic member 101 is interposed between the sensor protruding portion 2 and the through hole 40, the fore end protrusion 112 of the elastic member 101 is received in the groove 21 of the sensor protruding portion 2 to make a space with the groove 21, so that the fore end protrusion 112 is liable to be deformed in the space with the groove 21 of the sensor protruding portion 2. Therefore, in the case where the sensor protruding portion 2 is pulled with a force having a comparatively high intensity, the fore end protrusion 112 can be disconnected from the groove 21 without being damaged. As a result, the sensor 3 can be pulled away from the elastic member 101 without damaging the elastic member 101. Thereafter, the elastic member 101 can easily be pulled away from the through hole 40. Accordingly, in this modified embodiment, when a failure of the sensor 3 occurs, it is possible that the sensor 3 is replaced with another one without causing any breakage to the elastic member 101.

Incidentally, it should be recognized that it is sufficient that with respect to the contour of the elastic member 101 shown in FIG. 8, the corners of at least the fore end protrusion 112 have an adequate curvature to allow the sensor 3 to being pulled away from the elastic member 101 without damaging the elastic member 101 for the purpose of replacement of the pressure sensor 3 with another one. In the elastic member 101 in this modified embodiment, however, it should be noted that the elastic member 101 is immovably held in the same manner as the first embodiment so that the sensor 3 is not easily disconnected from the sensor attachment member 4 during practical use thereof.

A second different point consists in that the fore end flange 113 has a forwardly inclined surface 113a being a side face of a truncated cone. For this reason, the fore end flange 113 can relatively easily be inserted into the through hole 40 in the intermediate inserting step, even though the outer diameter of the fore end flange 113 is somewhat larger than the inner diameter D of the through hole 40. In this case, the intensity of the frictional force generated between the elastic member 101 and the through hole 40 is comparatively small. Moreover, when the final inserting step is completed, the outer diameter of the fore end flange 113 is enlarged in excess of the outer diameter of the flange 13 of the elastic member 1 in the first embodiment. As a result, the fore end flange 113 fixes the elastic member 101 to the sensor attachment member 4 more securely in additional cooperation with the rigidity of the forwardly inclined surface 113a thereof having a thick thickness. Accordingly, this modified embodiment is more acceptable than the above-described first embodiment of the present invention in respect of the aforementioned points.

Incidentally, the same materials as those for the elastic member 1 in the first embodiment can be employed for the elastic member 101 in this modified embodiment. In addition, the elastic members 1 and 101 in the first embodiment and the first modified embodiment thereof respectively have substantially cylindrical hollow shapes. However, the present invention should not be limited only to the aforementioned shapes. It may be noted that the present invention can be carried out for various types of elastic members having the other shapes. For example, an elastic member having a cylindrical shape which is partially cut away may be employed.

(Second Modified Embodiment of the First Embodiment)

In a second modified embodiment of the first embodiment, a method for attaching the sensor 3 to the sensor attachment member 4 is composed of steps different from those in the first embodiment. As shown in FIGS. 9A and 9B, the method for attaching the sensor 3 in this modified embodiment includes an elastic member inserting step and a sensor protruding portion inserting step. The parts and components similar to those in the first embodiment are shown by the same reference numerals and description thereof will be omitted.

First, in the elastic member inserting step as shown in FIG. 9A, only the elastic member 1 is inserted into the through hole 40 formed through the sensor attachment member 4. Consequently, the sensor attachment member 4 is clamped by the rear end flange 19 and the fore end flange 13 of the elastic member 1. In other words, the elastic member 1 is held on the sensor attachment member 4 in the state where the intermediate portion 14 of the elastic member 1 is fitted into the through hole 40 of the the sensor attachment member 4. The position where the elastic member 1 is set in this step relative to the sensor attachment member 4 is hereinafter referred to as a fixed position.

Next, in the sensor protruding portion inserting step, as shown in FIG. 9B, the sensor protruding portion 2 is inserted into the through hole of the elastic member 1 until the fore end portion 22 thereof protrudes from the through hole of the elastic member, that is, from the through hole 40 of the sensor attachment member 4. Accordingly, the fore end protrusion 12 of the elastic member 1 is received in the groove 21 formed on the outer circumferential surface of the intermediate portion 23 of the sensor protruding portion 2, whereby the sensor protruding portion 2 is fixed to the sensor attachment member 4 via the elastic member 1. As a result, the sensor 3 including the sensor protruding portion 2 is firmly fixed to the sensor attachment member 4.

By employing the sensor attaching method as mentioned above, the same sensor assembled body 5 as that in the first embodiment can be obtained. In addition, in the second modified embodiment, it is not necessary to perform the provisional assembling step described in the first embodiment.

(Second Embodiment)

In a second preferred embodiment according to the present invention, as shown in FIG. 10, an elastic member 1A is employed in place of the elastic member 1 in the first embodiment. The elastic member 1A is characterized in that it includes sensor rotation preventive means for preventing a sensor protruding portion 2A from rotating in a through hole 40 relative to a sensor attachment member 4A.

The shapes of the sensor 3A having the sensor protruding portion 2A and the sensor attachment member 4A are not different from those in the first embodiment except the following points. That is, the sensor protruding portion 2A of the sensor 3A has a rounded part R formed at the fore end portion 22A thereof to be smoothly inserted into the elastic member 1A. In addition, the through hole 40A of the sensor attachment member 4A has a chamfered portion 4d at the end thereof so that the elastic member 1A is smoothly inserted therein without causing any damage to the elastic member 1A. The other features of the sensor 3A and the sensor attachment member 4A in the second embodiment are the same as those in the first embodiment.

A main different point of this embodiment different from the first embodiment as well as from the modified embodiments as mentioned above consists in the contour of the elastic member 1A and it will be described herebelow in more detail. In the elastic member 1A, as shown in FIG. 10, a rear end flange 19A has a protrusion 191 (third protrusion) formed on the whole circumferential portion thereof to protrude in an opposite direction of the fore end portion 112 (in the upward direction in FIG. 10) of the elastic member 1A. The protrusion 191 functions as the foregoing sensor rotation preventive means. Here, it is practically sufficient that the protrusion 191 only slightly protrudes from the rear end flange 19A. The thickness of the rear end flange 19A around the circumferential edge portion thereof is thick compared to the other portion thereof. In addition, it is not necessary that the protrusion 191 is formed along the whole circumference of the rear end flange 19A, and it is practically acceptable that the protrusion 191 is formed merely on a part of the whole circumferential portion of the rear end flange 19A.

Next, effects derived from the second embodiment will be described. Although FIG. 10 shows the state before the intermediate insertion step is performed, a sensor assembled body is built up by inserting the sensor protruding portion 2A and the elastic member 1A into the sensor attachment member 4A. In the sensor assembled body, the fore end protrusion 112 of the elastic member 1A is fitted into the groove 21A of the sensor protruding portion 2A in the same manner as the first embodiment and the fore end flange 113 of the elastic member 1A abuts the inside wall surface 4a of the sensor attachment member 4A.

When dimensions of each portion are adequately determined, in this state, the sensor protruding portion 2A is subjected to a sucking force which is oriented toward the inside of the sensor attachment member 4A (in the lower direction in FIG. 10) owing to the rubber elasticity of the elastic member 1A. Accordingly, the end surface 31a of the sensor main body 31 is brought in contact with the rear end flange 19A of the elastic member 1A by a thrusting force. In this case, as mentioned above, the protrusion 191 is formed along the whole circumference of the rear end flange 19A so that the thickness of the rear flange 19A at the circumference thereof is thick compared to the other portion thereof. Therefore, the rear end flange 19A is sandwiched at the circumferential portion thereof between the end surface 31a of the sensor main body 31 and the outside wall surface 4b of the sensor attaching member 4A.

As a result, static frictional forces are generated between the rear end flange 19A and the end surface 31a of the sensor main body 31, and between the rear end flange 19A and the outside wall surface 4b of the sensor attachment member 4A. Specifically, the sensor main body 31 and the sensor attachment member 4A are connected to each other through the circumferential portion of the rear end flange 19A where a sufficient length as measured from the axis of the sensor protruding portion 2A is assured. Therefore, in the case that a torque is applied to the sensor 3A, an inverse torque having a relatively large intensity is generated by the static frictional forces and applied to the sensor 3A so that the sensor 3A cannot easily rotate. Therefore, the sensor 3A does not rotate by normal vibration, a shock or the like unless a torque having a certain amount is intentionally applied to the sensor attachment member 4A. By employing the elastic member 1A in this embodiment, the sensor 3A can be installed with an desired angle and the angle can be adjusted after the installation. In addition, as mentioned above, unintentional rotation of the sensor 3 does not occur. The other effects are the same as in the foregoing embodiments.

The rear end flange 19A in the second embodiment has only one protrusion 191 formed on the surface thereof on the sensor side. However, the rear end flange 19A can have two protrusions formed on the both surfaces thereof to respectively protrude toward the sensor side and the sensor attachment member side. In this case, it is apparent that the same effects as those in the second embodiment can be obtained. In addition, the protrusions may have fine irregularities or fine notches on the surfaces thereof which the end surface 31a of the sensor main body 31 and the outside wall surface 4b of the sensor attachment member 4A respectively abut. Accordingly, static frictional coefficients of the protrusions of the rear end flange 19A with the end surface 31a of the sensor main body 31 and with the outside wall surface 4b of the sensor attachment member 4A are increased, so that the aforementioned rotation preventive effect is improved. In addition, in the case where fine irregularities or fine notches are likewise formed on the end surface 31a of the sensor main body 31 as well as on the outside wall surface 4b of the sensor attachment member 4A, the aforementioned static frictional coefficients are additionally increased, so that the rotation preventive effect is further improved.

(Third Embodiment)

Figure 11:
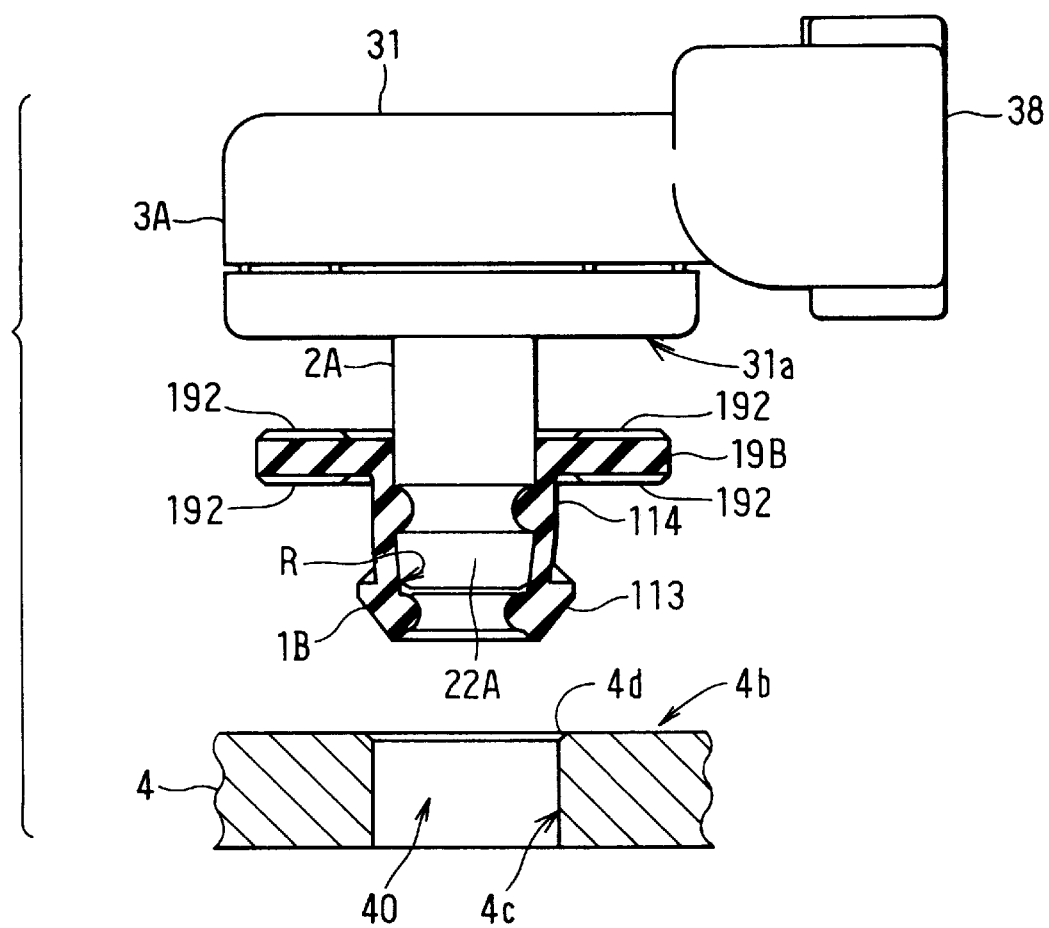
FIG. 11 is a partial cross-sectional view showing an elastic member, a sensor, and a sensor attachment member in a third preferred embodiment according to the present invention.

As shown in FIG. 11, in an elastic member 1B employed in a third preferred embodiment is also characterized in that an elastic member 1B includes sensor rotation preventive means for preventing the sensor protruding portion 2A from rotating in the through hole 40 relative to the sensor attachment portion 4A. In this embodiment, the sensor 3A including the sensor protruding portion 2A and the sensor attachment member 4A has the same structures as those in the second embodiment and are shown in the same reference numerals.

A main different point of this embodiment from the above-described second embodiment consists in the contour of a rear end flange 19B of the elastic member 1B. In more detail, the elastic member 1B is constructed in the substantially same manner as the above-described second embodiment, however a plurality of irregularities 192 are formed on each of both surfaces of the rear end flange 19B to be arranged radially. When the sensor 3A is mounted on the sensor attachment member 4A via the elastic member 1B to form an assembled body, the rear end flange 19B of the elastic member 1B simultaneously abuts the end surface 31*a* of the sensor 3A and the outside wall surface 4*b* of the sensor attachment portion 4A at the portions where the plurality of irregularities 192 thereof are formed.

In this embodiment, the plurality of irregularities 192 of the rear end flange 19B of the elastic embmer 1B functions as the sensor rotation preventive means. Specifically, the irregularities 192 of the rear end flange 19B have a function for increasing the frictional coefficient of the rear end flange 19B with the other member which abuts the rear end flange 19B. Therefore, the sensor main body 31 and the sensor attachment member 4A connected to each other via the rear end flange 19B are not likely to rotate each other. Accordingly, in the third embodiment, the same effects as those in the second embodiment as mentioned above can be obtained.

In place of the aforementioned irregularities 192, a plurality of fine notches may be formed on both surfaces of the rear end flange 19B with a predetermined pitch. These plural fine notches formed on the rubber elastic material with a predetermined pitch serve to increase the frictional coefficient of the elastic material with respect to a flat plane in the same manner as notches employed for studless tires, basket shoes or the like. Consequently, the notches formed on the rear end flange 19B can provide the same effects as those of the irregularities 192 formed on the rear end flange 19B in the third embodiment.

Further, irregularities adapted to be engaged with the irregularities 192 of the rear end flange 19B may be formed on the end surface 31*a* of the sensor main body 31 as well as on the outside wall surface 4*b* of the sensor attachment member 4A. In this case, the effect for preventing the rotations of the sensor 3A and the sensor attachment member 4A can be further enhanced. In addition, even though both surfaces of the rear end flange 19B are formed in the flat manner, the irregularities can be formed on the end surface 31*a* of the sensor main body 31 and on the outside wall surface 4*b* of the sensor attaching member 4A. This case also can provide the substantially same effects as those obtainable in the third embodiment.

(Fourth Embodiment)

Figure 12A:
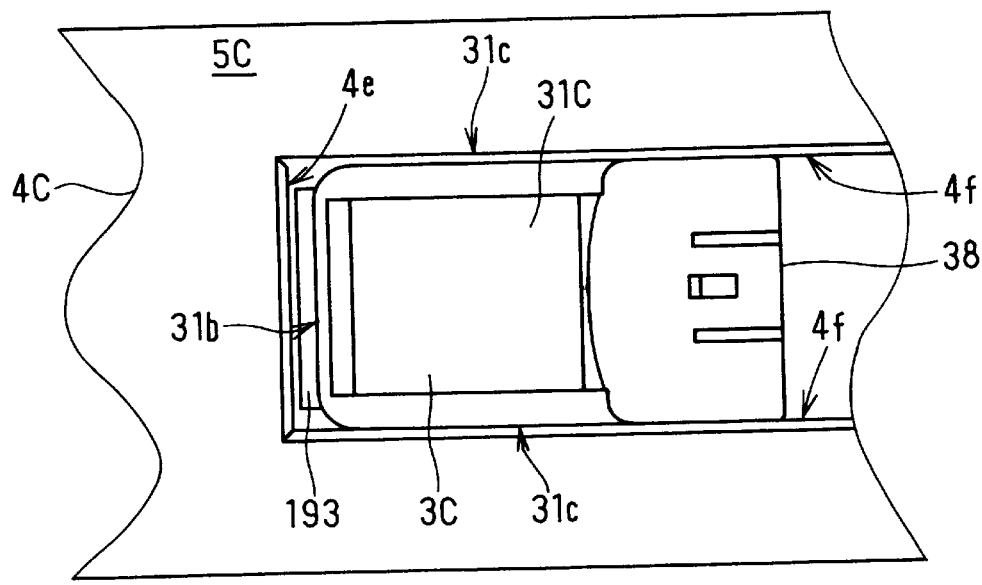
FIG. 12A is a plan view showing a sensor assembled body in a fourth preferred embodiment.
Figure 12B:
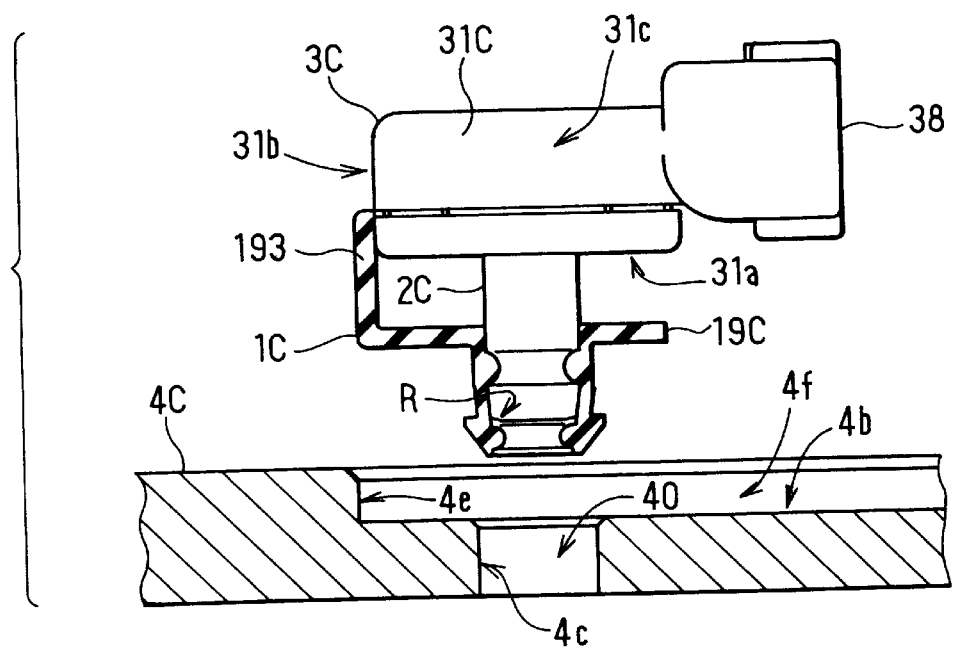
FIG. 12B is a partial cross-sectional view showing an elastic member, a sensor, and a sensor attachment member in the fourth embodiment.

In a fourth preferred embodiment of the present invention, a sensor assembled body 5C is characterized in that it includes sensor rotation preventive means for preventing a sensor protruding portion 2C shown in FIG. 12B from rotating in a through hole 40 relative to a sensor attachment member 4C. In this embodiment, flat side walls 31*b* and 31*c* of the sensor main body 31C and flat wall surfaces 4*e* and 4*f* of the sensor attachment member 4C cooperatively function as the sensor rotation preventing means.

In more detail, the sensor attachment member 4C has a groove shown in FIG. 12B to face the end surface 31*a* of the sensor main body 31C, and the outside wall surface 4*b* of the sensor attachment member 4C is a bottom surface of the groove. Specifically, in the sensor assembled body 5C shown in FIG. 12A, three sides of the sensor main body 31C having a substantially rectangular parallelopiped shape are surrounded by the wall surfaces 4*e* and 4*f* being the inside side surfaces of the groove, and only one side of the sensor main body 31C to which the connector 38 is connected is opened. Both of the side walls 31*c* of the sensor main body 31C respectively abut or face the wall surfaces 4*f* of the groove to make a narrow gap. In addition, the side wall 31*b* of the sensor main body 31C opposite to the connector side (in the left side in FIG. 12A) faces the wall surface 4*e* of the sensor attachment member 4C to make a predetermined gap therebetween. Incidentally, a chamfered part is formed along the edge of each of the wall surfaces 4*e* and 4*f* of the groove on the sensor attachment member 4C, thereby making the attachment process easy. On the other hand, the elastic member 1C interposed between the sensor attachment member 4C and the sensor main body 31C has a tongue-like rotation preventive portion (third protrusion) 193 shown in FIG. 12B formed on an end of the rear end flange 19C thereof to protrude to be interposed in the gap between the side wall 31*b* of the sensor main body 31C and the wall surface 4*e* of the sensor attachment member 4C.

As described above, in the sensor assembled body 5C in this embodiment, the side walls 31*c* of the sensor main body 31C and the wall surfaces 4*f* of the sensor attachment member 4 face each other to make or to not make a narrow gap. Therefore, the sensor 3C hardly rotates relative to the sensor attachment member 4C. Even if the sensor 3C rotates relative to the sensor attachment member 4 by a small quantity of angle corresponding to the foregoing gap, the rotation of the sensor 3C is absorbed by rubber elastic deformation of the elastic member 1C. That is, even if a torque is applied to the sensor 3C, any sliding movement is not induced between the surface of the elastic member 1C and the inner circumferential surface 4*c* of the through hole 40 formed through the sensor attachment member 4C, so that the elastic member 1C is not worn due to the friction therebetween. Additionally, any sliding movement is not induced between the sensor protruding portion 2C and the elastic member 1C for the same reason as mentioned above, so that the elastic member 1C is not worn due to the friction therebetween as well. Further, the tongue-like rotation preventive portion 193 of the elastic member 1C serves to prevent the elastic member 1C from being rotated relative to the sensor attachment member 4C as well as to the sensor protruding portion 2C.

Accordingly, the sensor 3C, the elastic member 1C and the sensor attachment member 4 are not rotated relative to each other, so that the installed angle of the sensor 3C does not change. Further, because the aforementioned three components do not slidably move relative to each other for the same reason as mentioned above, they are not liable to be worn even when disposed under heavy environment so that vibration, shock, or the like is applied thereto. In addition, due to the groove formed on the sensor attachment member 4 shown in FIG. 12B, the position of the sensor 3C to be attached to the sensor attachment member 4 is clearly determined. Therefore, it is easy to appropriately position the sensor protruding portion 2C even though the through hole 40 is not visually recognized, so that the assembling work can more easily and exactly be performed.

Figure 13:
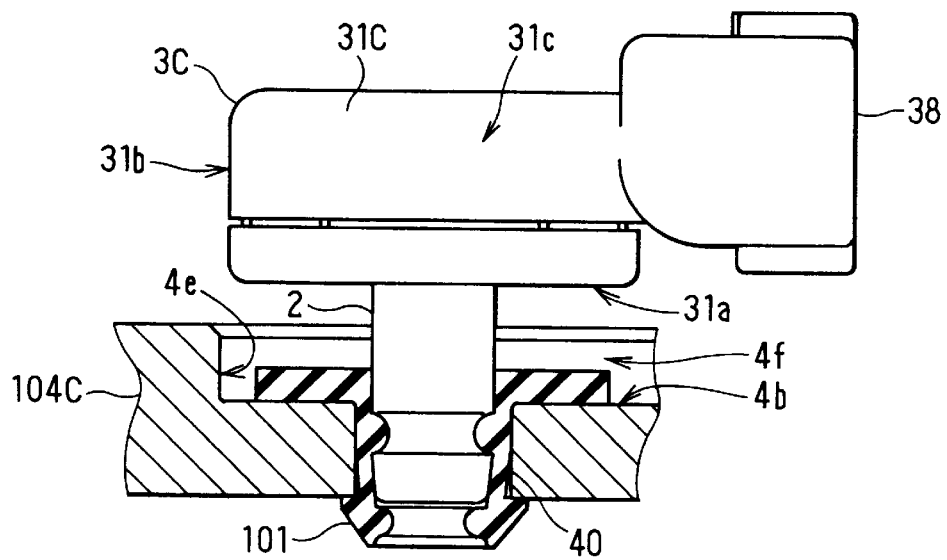
FIG. 13 is a partial cross-sectional view showing an elastic member, a sensor, and a sensor attachment member in a modified embodiment of the fourth embodiment.

As is apparent from FIG. 13 which shows the state directly before the final inserting step, the elastic member 1C employed for the aforementioned fourth embodiment can be replaced with the elastic member 101 shown in FIG. 8 having an axially symmetrical shape without the tongue-like rotation preventive portion 193. In this case, it is preferable that the sensor attachment member 4C shown in FIG. 12B is replaced with a sensor attachment member 104C shown in FIG. 13. The sensor attachment member 104C has a distance between the wall surface 4*e* and the through hole 40 smaller than that of the sensor attachment member 4C in FIG. 12B.

Accordingly, when the insertion of the sensor protruding portion 2 into the through hole 40 is completed, the side wall 31b of the sensor main body 31C and the wall surface 4e of the sensor attachment member 104C face each other to make a small gap therebetween compared to the gap of the sensor attachment member 4C.

In this case, the rotation of the sensor 3C relative to the sensor attachment member 104C can be completely prevented in the same manner as the above-described fourth embodiment. In addition, because the elastic member 101 is clamped between the sensor 3C and the sensor attachment member 104C, it is unlikely that a torque having a large intensity is applied only to the axially symmetrical elastic member 101. Therefore, the elastic member 101 is unlikely to rotate with respect to the sensor 3C and to the sensor attachment member 104C. That is, the sensor 3C, the sensor attachment member 104C and the elastic member 101 can be prevented from rotating with respect to each other. In addition, because the elastic member 101 is designed in the axially symmetrical shape, the component cost thereof can be reduced much more than that of the elastic member 1C shown in FIG. 12B. Additionally, because there does not arise a necessity for matching the orientation of the elastic member 101 with the orientation of the sensor 3C, man-hour for assembling the sensor 3C and the elastic member 101 is reduced, thereby resulting in low cost.

In the fourth embodiment, it is sufficient to employ only one of the three wall surfaces 4e and 4f of the sensor attachment member 4C, 104C to enable the same effect for preventing the rotation of the sensor 3C to be exhibited. That is, it is not always necessary that all the three wall surfaces 4e and 4f of the sensor attachment member 4C, 104C are employed. One or two of the wall surfaces 4e and 4f may be obtained by forming levee-like protrusions on the surface of the sensor attachment member 4C, 104C. Alternatively, a plurality of protrusions may be formed on the sensor attachment member 4C, 104C in place of the wall surfaces 4e and 4f.

The tongue-like rotation preventive portion 193 of the elastic member 2C may extend in the upward direction in FIG. 12B to protrude from the sensor 3C and the sensor attachment member 4C. In accordance with this modification, when the sensor 3C is disconnected from the sensor attachment member 4C in the assembled state, the sensor 3 can be disconnected from the sensor attachment member 4C by pulling up the rotation preventive portion 193 protruding from the sensor main body 31C. In this way, the disconnection of the sensor 3C can easily be conducted.

(Fifth Embodiment)

Figure 14:
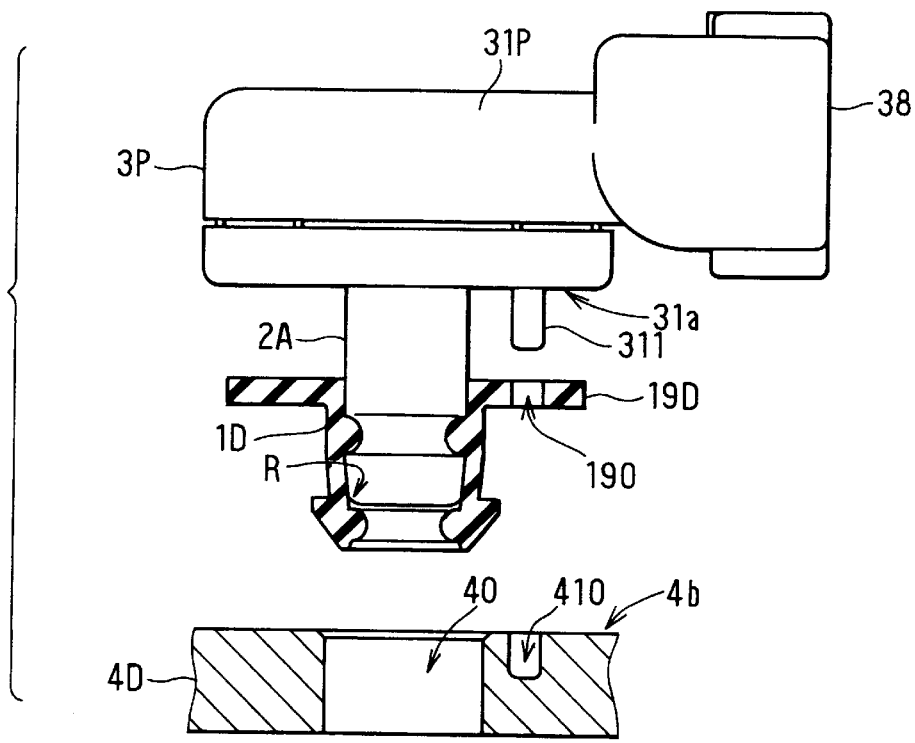
FIG. 14 is a partial cross-sectional view showing an elastic member, a sensor, and a sensor attachment member in a fifth preferred embodiment.

As shown in FIG. 14 which illustrates the state directly before the intermediate inserting step, in a fifth preferred embodiment, a sensor 3P, an elastic member 1D and a sensor attachment member 4D are employed. Specifically, the sensor main body 31P of the sensor 3P has a pin (fourth protrusion) 311 protruding from the end surface 31a thereof. In the assembled state, the pin 311 extends through a through hole 190 formed in a rear end flange 19D of the elastic member 1D to be fitted into a blind hole (recess) 410 formed on an outside wall surface 4b of the sensor attachment member 4D.

Here, the elastic member 1D is constructed such that a single through hole 190 is formed through the rear end flange 19D of the elastic member 1D. The other features are the same as those of the elastic member 101 (see FIG. 8) in the first embodiment. Each of the position of the through hole 190 of the elastic member 1D and the position of the blind hole 410 of the sensor attachment member 4D corresponds to the position of the pin 311 of the sensor main body 31P. In this embodiment, the pin 311 of the sensor main body 31P, the through hole 190 of the elastic member 1D, and the blind hole 410 of the sensor attachment member 4D cooperatively function as the sensor rotation preventive means.

In the fifth embodiment, the pin 311 of the sensor 3P, the through hole 190 of the elastic member ID and the blind hole 410 of the sensor attachment member 4D are fitted into each other. Accordingly, the sensor 3P, the elastic member 1D and the sensor attachment member 4C are reliably prevented from rotating with respect to each other within the range defined by the strength of the pin 311. In addition, in an assembling process for forming a sensor assembled body, because the position of the sensor 3P is definitely determined due to the pin 311 of the sensor 3P, the positioning of the sensor 3P with respect to the elastic member 1D and the sensor attachment member 4D can more exactly be performed. Additionally, when the fitting accuracy of the pin 311 with respect to the blind hole 190 is high, the positioning of the sensor 3P can more exactly be determined with respect to the sensor attachment member 4D.

In the fifth embodiment, although the sensor body 31P has the pin 311 protruding from the end surface 31a thereof to be fitted into the blind hole 410, the sensor attachment member 4D may have a pin protruding to be fitted into a blind hole formed on the end surface 31a of the sensor main body 31P. Alternatively, blind holes may be respectively formed on the sensor main body 31P and the sensor attachment member 4D at the positions corresponding to each other. In this case, an additional pin member passing through the through hole 190 of the elastic member 1D can be fitted into the blind hole of the sensor main body 31P and the sensor attachment member 4D to function as the sensor rotation preventive means in cooperation with the blind holes and the through holes 190. As a result, the same effects as those obtainable in the above-described fifth embodiment can be obtained.

(Sixth Embodiment)

Figure 15:
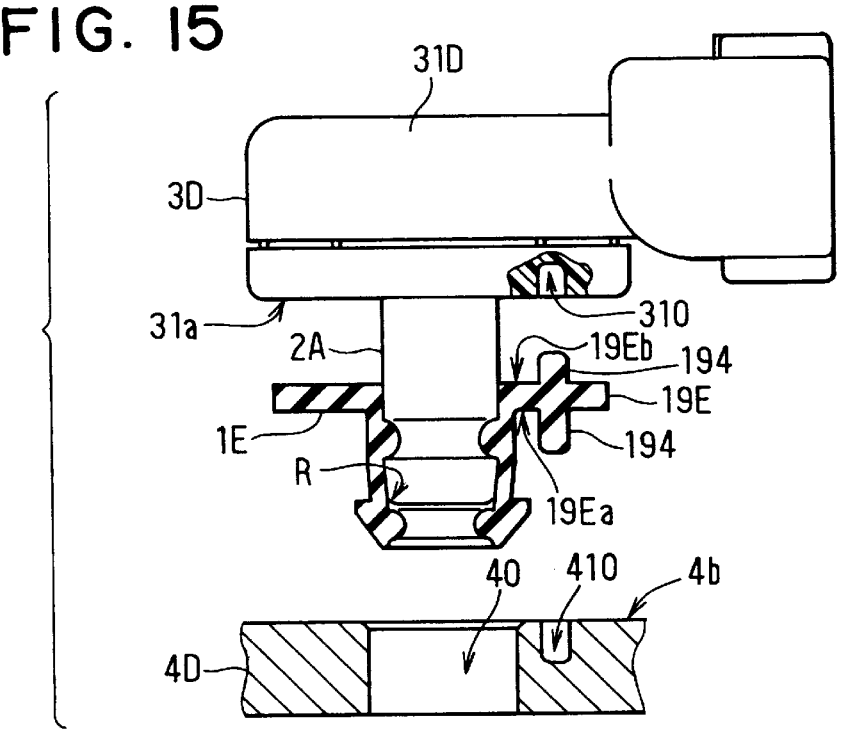
FIG. 15 is a partial cross-sectional view showing an elastic member, a sensor, and a sensor attachment member in a sixth preferred embodiment.

In a sixth preferred embodiment, as is apparent from FIG. 15, a sensor assembled body is composed of a sensor 3D, an elastic member 1E and the sensor attachment member 4D employed in the above-described embodiment. Specifically, the elastic member 1E is integrally formed with two pin-like protrusions (third protrusions) 194 respectively protruding from the front surface 19Ea and the rear surface 19Eb of the rear end flange 19E thereof. Further, blind holes 310 and 410 are respectively formed on the end surface 31a of the sensor main body 31D and the outside wall surface 4b of the sensor attachment member 4D at the positions corresponding to the protrusion 194 of the elastic member 1E.

Therefore, in the assembled state, the two protrusions 194 of the elastic member 1E are fitted into the blind hole 410 on the sensor attachment member 4D and the blind hole 310 on the sensor 3D. As a result, the elastic member 1E, the sensor attachment member 4D and the sensor 3D are prevented from rotating with respect to each other. In this embodiment, the two protrusions 194 of the elastic member 1E, the blind hole 410 of the sensor attachment member 4D, and the blind hole 310 of the sensor 3D cooperatively function as the sensor rotation preventive means. Accordingly, the same effects as those obtainable in the fifth embodiment can be obtained.

Figure 16:
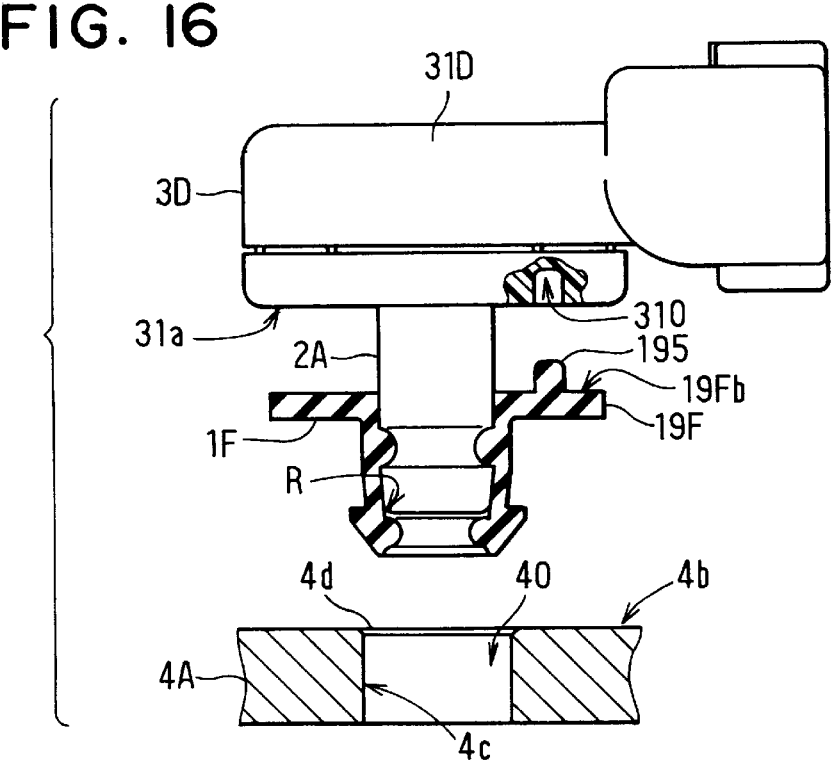
FIG. 16 is a partial cross-sectional view showing an elastic member, a sensor, and a sensor attachment member is a modified embodiment of the sixth embodiment.

The elastic member 1E can be replaced with an elastic member 1F shown in FIG. 16 having only one protrusion (third protrusion) 195 protruding from the rear end surface 19Fb of the rear end flange 19F thereof. In this case, only the sensor main body 31D has the blind hole 31O to be fitted with the protrusion 195 of the elastic member 1F. That is, special sensor rotation preventive means is not provided between the elastic member 1F and the sensor attachment member 4A. However, the outer circumferential surface of the elastic member 1F abuts the inner circumferential surface of the through hole 40 of the sensor attachment member 4A to produce a static frictional force therebetween, so that the effect for preventing the rotation of the elastic member 1F with respect to the sensor attachment member 4A is obtained.

Figure 17:
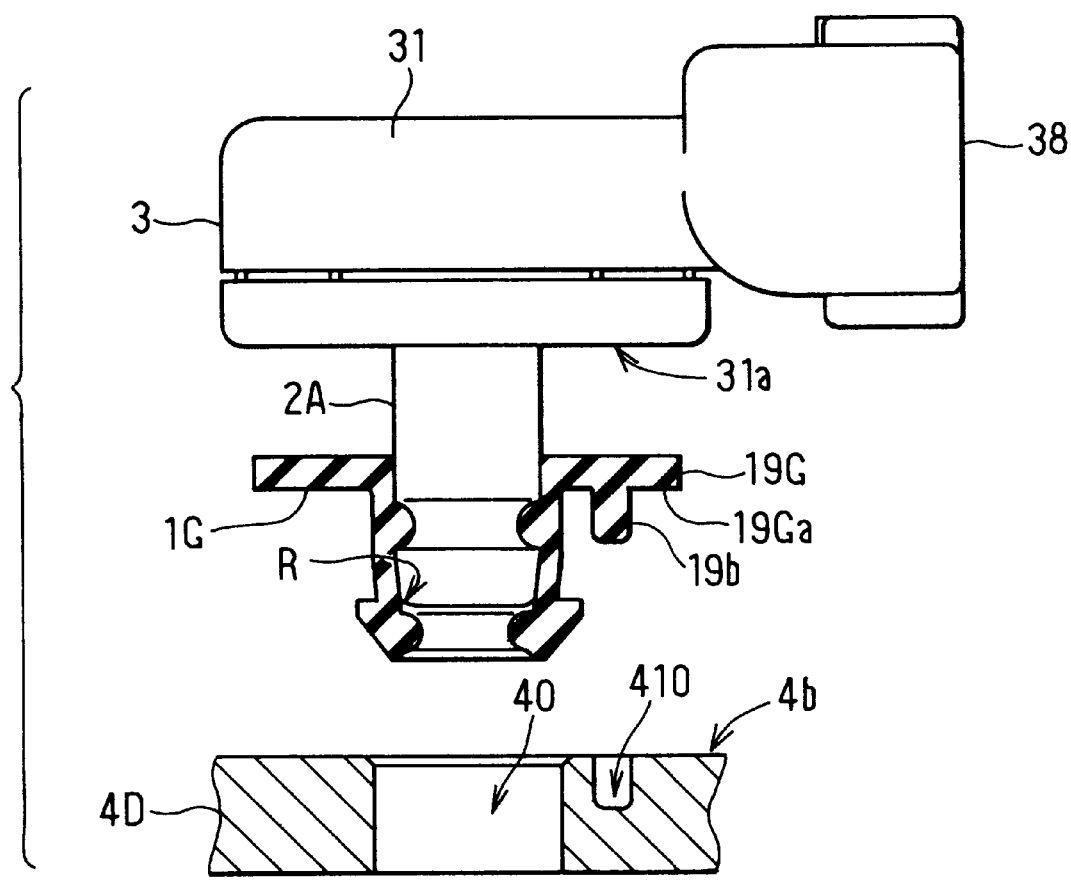
FIG. 17 is a partial cross-sectional view showing an elastic member, a sensor and a sensor attachment member in another modified embodiment of the sixth embodiment.

Further, the elastic member 1E can be replaced with an elastic member 1G shown in FIG. 17 as well. The elastic member 1G has only one protrusion 196 protruding from the fore end surface 19Ga of the rear end flange 19G thereof to be fitted into the blind hole 410 of the sensor attachment member 4D. In this case, any special sensor rotation preventive means is not provided between the elastic member and the sensor. However, as mentioned above, the outer circumferential surface of the elastic member 1G abuts the inner circumferential surface of the through hole 40 of the sensor attachment member 4D to produce a static frictional force therebetween, so that the effect for preventing the rotation of the elastic member 1G with respect to the sensor attachment member 4D is obtained.

To enhance the effects of preventing the rotations of the sensor, the elastic member, and the sensor attachment member, any one of the sensor rotation preventive means as explained in the second to sixth embodiments may be employed for the assembled body in conjunction with the other one of the sensor rotation preventive means. Further, it is apparent that the elastic members and the rotation preventive means described in the foregoing embodiments can be applied to the other components in addition to the sensor.

While the present invention has been shown and described with reference foregoing preferred embodiment, it will be apparent to those skilled in the art that changes in form and detail may be made therein without departing from the scope of the invention as defined in the appended claims.

What is claimed is:

1. An elastic member for attaching a sensor having a sensor protruding portion to a sensor attachment member having a through hole by intervening between the sensor protruding portion of the sensor and the through hole of the sensor attachment member, the elastic member comprising:
   a body member having a hollow shape with first and second ends for receiving the sensor protruding portion therein, the sensor protruding portion being insertable into the second end of the body member;
   a first end protrusion provided on an inner surface of the body member close to the first end of the body member to protrude inwardly;
   an intermediate protrusion provided on the inner surface of the body member to protrude inwardly between the first end protrusion and the second end of the body member, the intermediate protrusion being elastically deformed between the sensor protruding portion and the sensor attachment member, within the through hole, when the sensor protruding portion is fully inserted into the through hole of the sensor attachment member; and
   a second end flange provided on an outer surface of the body member surface close to the second end thereof to protrude outwardly.

2. An elastic member according to claim 1, wherein the first end protrusion is continuously formed to encircle the inner surface of the body member.

3. An elastic member according to claim 1, wherein the second end flange of the elastic member abuts a surface of the sensor attachment member on a sensor side in a state where the sensor is attached to the sensor attachment member via the elastic member.

4. An elastic member according to claim 1, wherein the elastic member includes a first end flange provided on the outer surface of the body member close to the first end thereof to protrude outwardly.

5. An elastic member according to claim 1, wherein the body member has a tapered portion on a first end side thereof, the tapered portion having an outer diameter gradually decreasing toward the first end of the body member.

6. An elastic member according to claim 1, wherein the elastic member has a rotationally symmetrical shape.

7. An elastic member according to claim 1, wherein the first end protrusion has a non-angular cross-sectional shape formed with a curve.

8. An elastic member for fixing a sensor having a sensor protruding portion to a sensor attachment member having a through hole by being inserted into the through hole of the sensor attachment member along with the sensor protruding portion which is held in the elastic member, the sensor protruding portion having an engagement portion, the elastic member comprising:
   a body member having a hollow shape with first and second ends for receiving the sensor protruding portion therein, the sensor protruding portion being insertable into the second end thereof;
   a first protrusion provided on an inner surface of the body member to protrude inwardly to be engaged with the engagement portion of the sensor protruding portion to provisionally fix the body member on the sensor protruding portion; and
   a second protrusion provided on the inner surface of the body member, closer to the first end than the first protrusion, to protrude inwardly to be engaged with the engagement portion of the sensor protruding portion to fix the body member on the sensor protruding portion in a state where the sensor protruding portion is completely inserted into the through hole of the sensor attachment members,
   wherein the first protrusion is elastically deformed between the sensor protruding portion and the sensor attachment member in the through hole in the state where the sensor protruding portion is completely inserted into the through hole of the sensor attachment member.

9. An elastic member according to claim 8, wherein the first protrusion seals the sensor protruding portion in the elastic member in the state where the sensor protruding portion is completely inserted into the through hole of the sensor attachment member.

10. An elastic member according to claim 8, wherein the body member has a tapered portion on an outer surface on the first end side thereof, the tapered portion having an outer diameter gradually decreasing toward the first end of the body member.

11. An elastic member according to claim 8, wherein the second protrusion has a non-angular cross-sectional shape formed with a curve.

12. An elastic member according to claim 8, wherein the elastic member has sensor rotation preventive means for preventing the rotation of the sensor protruding portion in the through hole of the sensor attachment member with respect to the sensor attachment member.

13. An elastic member according to claim 12, wherein the elastic member has a third protrusion provided on an outer surface of the body member to function as the sensor rotation preventive means.

14. An elastic member according to claim 12, wherein:
the sensor has a sensor body with an end surface thereof from which the sensor protruding portion protrudes;
the sensor attachment member has a sensor side surface to face the sensor body;
the elastic member has a flange provided on an outer surface of the body member on a second end side of the body member to protrude outwardly in a radial direction of the body member to intervene between the sensor side surface of the sensor attachment member and the end surface of the sensor body in the state where the sensor protruding portion is completely inserted into the through hole of the sensor attachment member; and
the sensor rotation preventive means is provided on the flange.

15. An elastic member according to claim 14, wherein the sensor rotation preventive means is one selected from a plurality of irregularities and a plurality of notches formed on a surface of the flange of the elastic member.

16. An elastic member according to claim 14, wherein the sensor rotation preventive means is a third protrusion provided on a surface of the flange facing the sensor body to protrude toward the sensor body.

17. An elastic member according to claim 14, wherein the sensor rotation preventive means is a fourth protrusion provided on a surface of the flange facing the sensor attachment member to protrude toward the sensor attachment member.

18. A sensor assembled body comprising:
a sensor attachment member having a through hole;
a sensor having a sensor body having an end surface, and a sensor protruding portion protruding from the end surface the sensor protruding portion being inserted into the through hole of the sensor attachment member to have a fore end portion thereof protruding from the through hole; and
an elastic member having a body member which intervenes between the through hole of the sensor attachment member and the sensor protruding portion, a first flange provided at a first end thereof on a sensor side to protrude outwardly in a radial direction of the body member and to be sandwiched between the end surface of the sensor body and a first surface of the sensor attachment member, a second flange provided at a second end thereof on a sensor attachment side to protrude outwardly in the radial direction of the body member and to protrude from the through hole of the sensor attachment member to face a second surface of the sensor attachment member opposite to the first surface, and an intermediate protrusion provided on an inner surface of the body member between the first and second ends to encircle the inner surface of the body member and elastically deform in the radial direction of the body member by the outer surface of the sensor protruding portion, within the through hole.

19. A sensor assembled body according to claim 18, wherein the fore end portion of the sensor protruding portion is tapered to have a diameter which continuously decreases to the fore end of the sensor protruding portion.

20. A sensor assembled body according to claim 19, wherein the body member of the elastic member has a tapered portion on the sensor attachment member side, the tapered portion having a diameter continuously decreasing the second end of the elastic member.

21. A sensor assembled body according to claim 20, wherein the second flange has the tapered portion on an outer surface thereof.

22. A sensor assembled body according to claim 20, wherein an outer diameter of the second flange is equal to or smaller than an inner diameter of the through hole.

23. A sensor assembled body according to claim 18, wherein a length between the first and second flanges in an axial direction of the elastic member is approximately equal to a length of the through hole in an axial direction of the through hole.

24. A sensor assembled body comprising:
a sensor having a sensor body with an end surface thereof and a sensor protruding portion protruding from the end surface and having a groove on an outer surface thereof;
a sensor attachment member having a through hole having an inner diameter larger than an outer diameter of the sensor protruding portion; and
an elastic member provided between the sensor protruding portion and the through hole of the sensor attachment member, the elastic member having a hollow shape and having first and second protrusions protruding from an inner surface thereof, the first protrusion being elastically deformed by the sensor protruding portion, within the through hole, to seal the sensor protruding portion held in the elastic member, the second protrusion being fitted into the groove of the sensor protruding portion outside the through hole, in a state where the sensor protruding portion is fully inserted into the through hole via the elastic member.

25. A sensor assembled body according to claim 24, wherein the second protrusion of the elastic member is fitted into the groove of the sensor protruding portion to make a space with the groove.

26. A sensor assembled body according to claim 25, wherein the second protrusion of the elastic member has a non-angular cross-sectional shape formed with a curve to make a space with the groove of the sensor protruding portion.

27. A sensor assembled body according to claim 24, wherein one of the sensor, the sensor attachment member and the elastic member has sensor rotation preventive means for preventing the sensor from rotating with respect to the sensor attachment member.

28. A sensor assembled body according to claim 27, wherein:
the sensor body has a side face;
the sensor attachment member has a recess having a side face approximately parallel to the side face of the sensor body, the trough hole formed in a bottom of the recess; and
the side face of the sensor body and a side face of the recess of the sensor attachment member face each other to function as the sensor rotation preventive means.

29. A sensor assembled body according to claim 28, wherein:
the elastic member has a tongue-like member provided at an end of the elastic member on a sensor body side, the tongue-like member extending to intervene between the side face of the sensor body and the side face of the recess of the sensor attachment member.

30. A sensor assembled body according to claim 24, wherein:
the elastic member has a flange provided at an end on an outer surface thereof on a sensor body side to protrude outwardly in a radial direction thereof to be sandwiched between the end surface of the sensor body and a surface of the sensor attachment member facing the sensor body via the elastic member:

the flange of the elastic member has a third protrusion thereon; and one of the end surface of the sensor body and the surface of the sensor attachment member has a recess to receive the third protrusion therein.

31. A sensor assembled body according to claim 24, wherein:

the elastic member has a flange provided at an end on an outer surface thereof on a sensor body side to protrude outwardly in a radial direction thereof to be sandwiched between the end surface of the sensor body and a surface of the sensor attachment member facing the sensor body via the elastic member:

the flange of the elastic member has a through hole therein; and one of the end surface of the sensor body and the surface of the sensor attachment member has a third protrusion to be fitted into the through hole of the flange of the elastic member.

32. A sensor assembled body according to claim 24, wherein the sensor protruding portion has a tapered portion at a fore end thereof, the tapered portion having an outer diameter which continuously decreases to the fore end.

33. A sensor assembled body according to claim 32, wherein the tapered portion of the sensor protruding portion is provided on a fore end side with respect to the groove and protrudes from the through hole of the sensor attachment member.

34. A sensor assembled body according to claim 32, wherein the elastic member has a tapered portion on an end thereof on a sensor attachment side, the tapered portion having an outer diameter which continuously decreases to the end on the sensor attachment side.

35. A sensor assembled body according to claim 24, wherein the first protrusion of the elastic member is fitted into the groove of the sensor protruding portion in a state where the sensor protruding portion is provisionally inserted into the elastic member.

36. A sensor assembled body according to claim 35, wherein, in the state where the sensor protruding portion is provisionally inserted into the elastic member, a distance from an end of the elastic member on a sensor side to the end surface of the sensor in an axial direction of the sensor protruding portion is approximately equal to the length between the first and second protrusions in the axial direction.

37. A sensor assembled body according to claim 36, wherein a width of the groove in an axial direction of the sensor protruding portion is approximately equal to a width of the second protrusion in an axial direction of the elastic member.

38. A sensor assembled body according to claim 35, wherein, in the state where the sensor protruding portion is provisionally inserted into the elastic member, a fore end of the sensor protruding portion abuts the second protrusion.

39. A method for attaching a sensor to a sensor attachment member via an elastic member, the method comprising the steps of:

attaching the elastic member having a hollow shape on a sensor protruding portion on the sensor to cover the sensor protruding portion to be in a provisionally fixed state, the elastic member having a first protrusion on an inner surface thereof, the first protrusion being received in a groove provided on an outer surface of the sensor protruding portion in the provisionally fixed state;

inserting the elastic member holding the sensor protruding portion therein into a through hole of the sensor attachment member to a set position of the elastic member; and inserting the sensor protruding portion more deeply into the elastic member and into the through hole of the sensor attachment member so that the first protrusion is deformed by the outer surface of the sensor protruding portion within the through hole, in a state where the elastic member is kept at the set position thereof in the through hole of the sensor attachment member.

40. A method for attaching a sensor to a sensor attachment member according to claim 39, wherein:

the sensor protruding portion has a fore end portion formed on a fore end side of the groove;

the elastic member has a second protrusion formed on the inner surface thereof, the second protrusion being formed adjacently to a first end of the elastic member, from which the elastic member is inserted into the through hole, and when the sensor protruding portion is more deeply inserted into the through hole of the sensor attachment member, the first protrusion of the elastic member is disconnected from the groove of the sensor protruding portion;

the second protrusion of the elastic member is fitted into the groove of the sensor protruding portion; and the fore end portion of the sensor protruding portion protrudes from the second end of the elastic member and from the through hole of the sensor attachment member.

41. A method for attaching a sensor to a sensor attachment member according to claim 40, wherein;

the sensor has a sensor body having a diameter larger than an internal diameter of the through hole of the sensor attachment member; and the fore end portion of the sensor protruding portion has an outer diameter which continuously decreases to the fore end thereof.

42. A method for attaching a sensor to a sensor attachment member according to claim 40, wherein:

the elastic member has a first flange formed on an outer surface on a second end thereof to protrude outwardly in a radial direction thereof; and the elastic member is inserted into the through hole of the sensor attachment member until the first flange abuts a surface of the sensor attachment member.

43. A method for attaching a sensor to a sensor attachment member according to claim 42, wherein:

the elastic member has a tapered flange portion on a first end side having a diameter which decreases toward the first end thereof and protrudes outwardly in the radial direction thereof;

when the elastic member is inserted into the through hole of the sensor attachment member, the tapered flange portion of the elastic member protrudes from the through hole; and when the sensor protruding portion is more deeply inserted into the through hole, the fore end portion of the sensor protruding portion protrudes from the elastic member and from the through hole enlarging the tapered flange portion of the elastic member by passing through in the elastic member.

44. A method for attaching a component having a component protruding portion to an attachment member via an elastic member, the method comprising the steps of:

inserting the component protruding portion into a through hole of the elastic member to be in a provisionally fixed state;

inserting the elastic member into a through hole of the attachment member to be a set position, while keeping the provisionally fixed state; and inserting the component protruding portion more deeply into the through hole of the elastic member and into the through hole of the attachment member to be fixed therein, while keeping the set position of the elastic member with respect to the attachment member, wherein the elastic member has a first protrusion on an inner surface of the through hole thereof, the first protrusion being elastically deformed by the component protruding portion by inserting the component protruding portion more deeply into the through hole of the elastic member and into the through hole of the attachment member.

45. A method for attaching a component to an attachment member according to claim 44, wherein the component is a pressure sensor.

46. A method for attaching a component to an attachment member according to claim 44, wherein:

the component protruding portion has a tapered portion at a fore end thereof having a diameter which continuously decreases the fore end; and by more deeply inserting the component protruding portion into the through hole of the elastic member and into the through hole of the attachment member, the tapered portion of the component protruding portion protrudes from the through hole of the elastic member and from the through hole of the attachment member.

47. A method for attaching a component to an attachment member according to claim 44, wherein:

the elastic member has first and second flanges respectively formed on an outer surface at first and second ends thereof to protrude outwardly in a radial direction thereof; and the elastic member is inserted into the through hole of the attachment member until the second flange of the elastic member protrudes from the through hole of the attachment member on an opposite side of the component and the first flange of the elastic member abuts a surface of the attachment member facing the component; and by more deeply inserting the component protruding portion into the through hole of the elastic member and into the through hole of the attachment member, the second flange of the elastic member abuts the other surface of the attachment member on the opposite side of the component.

48. A method for attaching a component to an attachment member according to claim 47, wherein the second flange of the elastic member is tapered to have an outer diameter which decreases to an end of the elastic member.

49. A method for attaching a component to an attachment member according to claim 48, wherein an outer diameter of the second flange is equal to or smaller than an inner diameter of the through hole of the attachment member.

50. A method for attending a component to an attachment member according to claim 47, wherein by inserting the component protruding portion more deeply into the through hole of the elastic member and into the through hole of the attachment member, the second flange of the elastic member is elastically deformed to abut a surface of the attachment member on the opposite side of the component.

51. A method for attaching a component to an attachment member according to claim 47, wherein a length between the first and second flanges in an axial direction of the elastic member is approximately equal to a length of the through hole of the attachment member in an axial direction of the through hole.

52. A method for attaching a component to an attachment member according to claim 44, wherein:

the component protruding portion has a groove on an outer surface thereof;

the elastic member has a second protrusion on the inner surface thereof, the second protrusion being closer to an end, from which the elastic member is inserted into the through hole of the attachment member, than the first protrusion;

the groove receives therein the first protrusion in the provisionally fixed state; and the groove receives therein the second protrusion by inserting the component protruding portion more deeply into the through hole of the elastic member.

53. A method for attaching a component to an attachment member according to claim 52, wherein:

the component protruding portion has a fore end portion at a fore end side of the groove; and the fore end portion abuts the second protrusion in the provisionally fixed state.

54. A method for attaching a component to an attachment member according to claim 52, wherein a width of the groove in an axial direction of the component protruding portion is approximately equal to a width of the second protrusion in an axial direction of the elastic member.

55. An elastic member for attaching a component having a component protruding portion to an attachment member having a through hole by being interposed into the through hole of the attachment member along with the component protruding portion, the elastic member comprising:

a body member having a hollow shape with first and second ends for receiving the component protruding portion therein and a tapered portion having an outer diameter which continuously decreases toward the second end thereof from which the elastic member is inserted into the through hole of the attachment member;

a first flange provided on an outer surface of the body member on the first end thereof to protrude outwardly in a radial direction of the body member, the first flange which abuts a first surface of the attachment member on a component side in a state where the component protruding portion is fully inserted into the through hole of the attachment member via the elastic member;

a second flange provided on the outer surface of the body member on the second end thereof to protrude outwardly in the radial direction of the body member, the second flange which abuts a second surface of the attachment member on an opposite side of the component side in the state where the component protruding portion is fully inserted into the through hole of the attachment member via the elastic member; and an intermediate protrusion provided on an inner surface of the body member between the first and second ends of the body member, for being elastically deformed in a radial direction of the body member, within the through hole, in the state where the component protruding portion is fully inserted into the through hole of the attachment member.

56. An elastic member according to claim 55, wherein:

the component protruding portion has a groove provided on an outer surface thereof; and the elastic member has a second end side protrusion provided on the inner surface of the body member close to the second end thereof to protrude inwardly in the radial direction of the body member, the second end side protrusion which is received in the groove of the component protruding portion in the state where the component protruding portion is fully inserted into the through hole of the attachment member via the elastic member.

* * * * *